United States Patent
Yerramalli et al.

(10) Patent No.: US 11,647,496 B2
(45) Date of Patent: May 9, 2023

(54) AUTONOMOUS UPLINK TRANSMISSION TECHNIQUES USING SHARED RADIO FREQUENCY SPECTRUM

(71) Applicant: QUALCOMM Incorporated, San Diego, CA (US)

(72) Inventors: Srinivas Yerramalli, San Diego, CA (US); Ahmed Kamel Sadek, San Diego, CA (US); Tamer Kadous, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/988,543

(22) Filed: Aug. 7, 2020

(65) Prior Publication Data

US 2020/0374897 A1    Nov. 26, 2020

Related U.S. Application Data

(62) Division of application No. 15/887,277, filed on Feb. 2, 2018, now Pat. No. 10,772,113.

(Continued)

(51) Int. Cl.
*H04W 72/12* (2009.01)
*H04W 72/04* (2023.01)
(Continued)

(52) U.S. Cl.
CPC ....... *H04W 72/1215* (2013.01); *H04L 1/0026* (2013.01); *H04L 1/0031* (2013.01);
(Continued)

(58) Field of Classification Search
CPC ......... H04W 72/1215; H04W 72/0413; H04W 72/1268; H04B 7/0413
See application file for complete search history.

(56) References Cited

U.S. PATENT DOCUMENTS

| 9,094,999 B2 | 7/2015 | Jechoux et al. |
| 2010/0271970 A1 | 10/2010 | Pan et al. |

(Continued)

FOREIGN PATENT DOCUMENTS

| CN | 101166055 A | 4/2008 |
| CN | 102892206 A | 1/2013 |

(Continued)

OTHER PUBLICATIONS

Ericsson, et al., "WF on MCOT limit Signaling and Modifying LBT Type," 3GPP Draft, R1-165716, 3rd Generation Partnership Project (3GPP) Mobile Competence Centre, 650, Route Des Lucioles, F-06921 Sophia-Antipolis Cedex, France, vol. RAN WG1, No. Nanjing, China, May 23, 2016-May 27, 2016, May 30, 2016, XP051111902, 5 pages, Retrieved from the Internet: URL:http://www.3gpp.org/ftp/tsgran/WG1_RL1/TSGR1_85/Docs/ [retrieved on May 30, 2016].

(Continued)

*Primary Examiner* — Brandon M Renner
(74) *Attorney, Agent, or Firm* — Holland & Hart LLP

(57) ABSTRACT

Techniques for autonomous uplink (AUL) transmissions are provided that allow for efficient use of shared radio frequency spectrum band resources. A user equipment (UE) may determine a duration of an AUL transmission and modify an uplink waveform or provide an indication to a base station of one or more channel resources that may be available for base station transmissions, in order to more fully utilize shared radio frequency spectrum band resources within a maximum channel occupancy time (MCOT). A base station may activate or deactivate AUL transmissions through downlink control information (DCI) transmitted to the UE. A UE and base station may exchange various other control information to provide relatively efficient autono- (Continued)

mous uplink transmissions and use of the shared radio frequency spectrum band resources.

15 Claims, 25 Drawing Sheets

Related U.S. Application Data

(60) Provisional application No. 62/455,469, filed on Feb. 6, 2017.

(51) Int. Cl.

| | | |
|---|---|---|
| *H04L 27/26* | (2006.01) | |
| *H04W 72/1268* | (2023.01) | |
| *H04L 1/00* | (2006.01) | |
| *H04L 1/1812* | (2023.01) | |
| *H04W 74/00* | (2009.01) | |
| *H04L 1/1607* | (2023.01) | |
| *H04L 5/00* | (2006.01) | |
| *H04L 1/1822* | (2023.01) | |
| *H04W 28/06* | (2009.01) | |
| *H04W 74/08* | (2009.01) | |

(52) U.S. Cl.
CPC .......... *H04L 1/0067* (2013.01); *H04L 1/1614* (2013.01); *H04L 1/1819* (2013.01); *H04L 1/1822* (2013.01); *H04L 5/0078* (2013.01); *H04L 5/0094* (2013.01); *H04L 27/2662* (2013.01); *H04W 72/0413* (2013.01); *H04W 72/1268* (2013.01); *H04W 74/006* (2013.01); *H04L 1/0003* (2013.01); *H04L 1/0009* (2013.01); *H04W 28/06* (2013.01); *H04W 72/042* (2013.01); *H04W 74/0808* (2013.01)

(56) References Cited

U.S. PATENT DOCUMENTS

| | | | |
|---|---|---|---|
| 2015/0341921 A1 | 11/2015 | Chen et al. | |
| 2016/0192261 A1 | 6/2016 | Wang et al. | |
| 2016/0295624 A1* | 10/2016 | Novlan | H04L 67/12 |
| 2016/0345193 A1* | 11/2016 | Takahashi | H04W 52/0212 |
| 2017/0019887 A1* | 1/2017 | Jiang | H04W 72/1263 |
| 2017/0041901 A1 | 2/2017 | Karaki et al. | |
| 2018/0227936 A1 | 8/2018 | Yerramalli et al. | |
| 2018/0367282 A1* | 12/2018 | Li | H04L 5/0094 |
| 2019/0029006 A1* | 1/2019 | Wang | H04W 72/1289 |
| 2019/0029029 A1* | 1/2019 | Ohtsuji | H04L 5/00 |
| 2019/0116609 A1* | 4/2019 | Feng | H04W 72/042 |
| 2020/0329489 A1* | 10/2020 | Li | H04W 72/1205 |

FOREIGN PATENT DOCUMENTS

| | | |
|---|---|---|
| KR | 20160094877 A | 8/2016 |
| WO | WO2016072717 A1 | 5/2016 |

OTHER PUBLICATIONS

Ericsson:"SPS Operation on sTTI", 3GPP Draft; R2-1701610—SPS and STTI, 3rdGeneration Partnership Project (3GPP), Mobile Competence Centre; 650, RouteDes Lucioles; F-06921 Sophia-Antipolis Cedex; France, vol. RAN WG2, No. Athens, Greece; Feb. 13, 2017-Feb. 17, 2017, Feb. 3, 2017 (Feb. 3, 2017), pp. 1-3,XP051223068, Retrieved from the Internet: URL: http://www.3gpp.org/ftp/tsg_ran/WG2_RL2/TSGR2_97/Docs/ [retrieved onFeb. 3, 2017].

Huawei,et al., "Support of Contention Based Uplink Transmission", 3GPPDraft; R2-166808 Support of Contention Based Uplink Transmission, 3rdGeneration Partnership Project (3GPP), Mobile Competence Centre; 650, RouteDes Lucioles; F-06921 Sophia-Antipolis Cedex; vol. RAN WG2, No. Kaohsiung;Oct. 10, 2016-Oct. 14, 2016, Oct. 9, 2016 (Oct. 9, 2016), pp. 1-5, XP051151261 ,Retrieved from the Internet: URL: http://www.3gpp.org/ftp/Meetings_3GPP_SYNC/RAN2/Docs/ [retrieved onOct. 9, 2016].

Intel Corporation: "UL URLLC Transmission Schemes", 3GPP Draft; R1-1612004 Intel—URLLC UL TX, 3rd Generation Partnership Project (3GPP), Mobile Competence Centre; 658, Route Des Lucioles; F-86921 Sophia-Antipolis Cedex; France vol. RAN WG1, No. Reno, USA; Nov. 14, 2016-Nov. 18, 2016, Nov. 6, 2016 (Nov. 6, 2016), XP051190814, 7 Pages, Retrieved from the Internet: URL:http://www.3gpp.org/ftp/tsg_ran/WG1_RL1/TSGR1_87/Docs/—[retrieved on Nov. 6, 2016].

Internationalsearch Report and Written Opinion—PCT/US2018/016807—ISA/EPO—dated Sep. 7, 2018.

International Preliminary Report on Patentability—PCT/US2018/016807, The International Bureau of WIPO—Geneva, Switzerland, dated Aug. 15, 2019.

Lenovo: "UL eMBB Transmission Multiplexing with UL URLLC", 3GPP Draft; R1-1700558, 3rd Generation Partnership Project (3GPP), Mobile Competence Centre; 650, Route Des Luciole; F-06921 Sophia-Antipolis Cedex; France vol. RAN WG1, No. Spokane, USA; Jan. 16, 2017-Jan. 20, 2017, Jan. 16, 2017 (Jan. 16, 2017), XP051208088, 4 Pages, Retrieved from the Internet: URL:http://www.3gpp.org/ftp/Meetings_3GPP_SYNC/RAN1/Docs/ [retrieved on Jan. 16, 2017].

Partial International Search Report—PCT/US2018/016807—ISA/EPO—dated May 9, 2018.

Samsung: "On UCI Multiplexing in PUSCH", 3GPP Draft; R1-1700948, UCI on PUSCH, 3rd Generation Partnership Project (3GPP), Mobile Competence Centre; 650, Route Des Lucioles; F-06921 Sophia-Antipolis Cedex; France, vol. RAN WG1, No. Spokane, USA; Jan. 16, 2017-Jan. 20, 2017, Jan. 16, 2017 (Jan. 16, 2017), XP051208464, Retrieved from the Internet: URL: http://www.3gpp.org/ftp/Meetings_3GPP_SYNC/RAN1/Docs/ [retrieved on Jan. 16, 2017].

Taiwan Search Report—TW107103959—TIPO—dated Jun. 23, 2021 (172713TW).

* cited by examiner

AUTONOMOUS UPLINK TRANSMISSION TECHNIQUES USING SHARED RADIO FREQUENCY SPECTRUM

CROSS REFERENCES

The present Application for Patent is a Divisional of U.S. patent application Ser. No. 15/887,277 by Yerramalli et al., entitled "Autonomous Uplink Transmission Techniques Using Shared Radio Frequency Spectrum" filed Feb. 2, 2018, which claims priority to U.S. Provisional Patent Application No. 62/455,469 by Yerramalli, et al., entitled "Autonomous Uplink Transmission Techniques Using Shared Radio Frequency Spectrum," filed Feb. 6, 2017, assigned to the assignee hereof.

BACKGROUND

The following relates generally to wireless communication, and more specifically to autonomous uplink transmission techniques using shared radio frequency spectrum.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

Some wireless systems may enable communication between a base station and a UE over shared or unlicensed radio frequency spectrum bands, or over different radio frequency spectrum bands (e.g., licensed radio frequency spectrum bands and unlicensed radio frequency spectrum bands). When using a shared or unlicensed radio frequency spectrum band, transmitters (e.g., UEs, base stations, or other network access devices) may perform contention-based channel access (e.g., by performing a listen before talk (LBT) procedure) according to contention-based rules that provide for fair channel access to transmitters that wish to use the shared radio frequency spectrum band.

In some cases, a base station may schedule UEs for uplink communications through an assignment or grant of resources. In some cases, a base station may configure a UE to autonomously transmit uplink communications according to an autonomous uplink configuration. In such cases, the base station may not be aware of particular timings for uplink transmissions, due to the autonomous nature of such transmissions and due to the contention-based access to the shared radio frequency spectrum band.

SUMMARY

The described techniques relate to improved methods, systems, devices, or apparatuses that support autonomous uplink transmissions using shared radio frequency spectrum. Generally, the described techniques provide for efficient coordination of autonomous uplink transmissions, and various associated downlink transmissions. For example, a user equipment (UE) may have data that is to be transmitted according to an autonomous uplink configuration, and may determine a duration of the associated uplink transmission. The UE may modify an uplink waveform or provide an indication to a base station of one or more channel resources that may be available for base station transmissions, in order to more fully utilize shared radio frequency spectrum band resources within a maximum channel occupancy time (MCOT). In some cases, a base station may configure a UE to perform autonomous uplink transmissions, and may activate or deactivate autonomous uplink transmissions based on various factors (e.g., channel conditions, traffic at the base station, etc.) through downlink control information transmitted to the UE. In some cases, the UE and base station may exchange various control information to provide relatively efficient autonomous uplink transmissions and use of the shared radio frequency spectrum band resources.

A method of wireless communication is described. The method may include contending for access to a channel of a shared radio frequency spectrum band in accordance with an autonomous uplink configuration which indicates a transmission window available for autonomous uplink transmissions, determining one or more channel access parameters based at least in part on one or more of a duration of an uplink transmission to be transmitted over the channel of the shared radio frequency spectrum band or a TA for the uplink transmission, and transmitting the uplink transmission over the channel of the shared radio frequency spectrum band in accordance with the autonomous uplink configuration, wherein the uplink transmission indicates one or more of the channel access parameters.

An apparatus for wireless communication is described. The apparatus may include means for contending for access to a channel of a shared radio frequency spectrum band in accordance with an autonomous uplink configuration which indicates a transmission window available for autonomous uplink transmissions, means for determining one or more channel access parameters based at least in part on one or more of a duration of an uplink transmission to be transmitted over the channel of the shared radio frequency spectrum band or a TA for the uplink transmission, and means for transmitting the uplink transmission over the channel of the shared radio frequency spectrum band in accordance with the autonomous uplink configuration, wherein the uplink transmission indicates one or more of the channel access parameters.

Another apparatus for wireless communication is described. The apparatus may include a processor, memory in electronic communication with the processor, and instructions stored in the memory. The instructions may be operable to cause the processor to contend for access to a channel of a shared radio frequency spectrum band in accordance with an autonomous uplink configuration which indicates a transmission window available for autonomous uplink transmissions, determine one or more channel access parameters based at least in part on one or more of a duration of an uplink transmission to be transmitted over the channel of the shared radio frequency spectrum band or a TA for the uplink transmission, and transmit the uplink transmission over the channel of the shared radio frequency spectrum band in accordance with the autonomous uplink configuration, wherein the uplink transmission indicates one or more of the channel access parameters.

A non-transitory computer readable medium for wireless communication is described. The non-transitory computer-readable medium may include instructions operable to cause a processor to contend for access to a channel of a shared radio frequency spectrum band in accordance with an autonomous uplink configuration which indicates a transmission window available for autonomous uplink transmissions, determine one or more channel access parameters based at least in part on one or more of a duration of an uplink transmission to be transmitted over the channel of the shared radio frequency spectrum band or a TA for the uplink transmission, and transmit the uplink transmission over the channel of the shared radio frequency spectrum band in accordance with the autonomous uplink configuration, wherein the uplink transmission indicates one or more of the channel access parameters.

In some examples of the method, apparatus, and non-transitory computer-readable medium described above, a maximum channel occupancy time (MCOT) for the uplink transmission may be identified, and a difference between the MCOT and the duration of the uplink transmission may be determined, and the difference between the MCOT and the duration of the uplink transmission may be indicated in the uplink transmission. In some examples of the method, apparatus, and non-transitory computer-readable medium described above, the difference between the MCOT and the duration of the uplink transmission may be indicated in the channel access parameters as a number of subframes available for use by one or more other transmitters.

Some examples of the method, apparatus, and non-transitory computer-readable medium described above may further include processes, features, means, or instructions for modifying a waveform of the uplink transmission based at least in part on the TA. In some examples of the method, apparatus, and non-transitory computer-readable medium described above, the modifying the waveform may include formatting data to be transmitted into the uplink transmission, identifying a timing for starting a subsequent downlink transmission following the uplink transmission and a maximum time gap between the uplink transmission and the subsequent downlink transmission, determining a difference between the maximum time gap and the TA, and puncturing a last symbol of the uplink transmission for a duration of the difference between the maximum time gap and the TA.

In some examples of the method, apparatus, and non-transitory computer-readable medium described above, the modifying the waveform may include formatting data to be transmitted into the uplink transmission, identifying a timing for starting a subsequent downlink transmission following the uplink transmission and a maximum time gap between the uplink transmission and the subsequent downlink transmission, determining a time difference between an end of a last symbol of the uplink transmission and the maximum time gap, and cyclically extending samples of the last symbol of the uplink transmission to extend for a duration of the difference between the maximum time gap and the TA.

In some examples of the method, apparatus, and non-transitory computer-readable medium described above, the one or more channel access parameters may be determined by determining that the TA exceeds a maximum time gap between the uplink transmission and a subsequent downlink transmission, and indicating the TA in the uplink transmission to allow another transmitter to transmit a reservation signal for at least a portion of the TA.

Some examples of the method, apparatus, and non-transitory computer-readable medium described above may further include processes, features, means, or instructions for identifying uplink control information (UCI) associated with the uplink transmission, and transmitting the UCI in a symbol of the uplink transmission before a last symbol of the uplink transmission.

Some examples of the method, apparatus, and non-transitory computer-readable medium described above may further include processes, features, means, or instructions for identifying a time for starting a subsequent downlink transmission following the uplink transmission, and formatting the uplink transmission to occupy the channel of the shared radio frequency spectrum band until the time for starting the subsequent downlink transmission, where a transmitter of the subsequent downlink transmission performs a CCA to occupy a maximum time gap between the uplink transmission and the subsequent downlink transmission.

Some examples of the method, apparatus, and non-transitory computer-readable medium described above may further include processes, features, means, or instructions for transmitting a time difference between a MCOT and a duration of the uplink transmission to a base station, where the base station may transmit one or more transmissions during the time difference and one or more other transmitters may be precluded from transmitting during the time difference.

Some examples of the method, apparatus, and non-transitory computer-readable medium described above may further include processes, features, means, or instructions for determining that additional data may be to be transmitted following the transmission window, and transmitting one or more subsequent uplink transmissions after the uplink transmission outside of the transmission window when a MCOT may be determined as part of the contending for access to the channel of the shared radio frequency spectrum band. In some examples of the method, apparatus, and non-transitory computer-readable medium described above, a first subframe of a first subsequent uplink transmission of the one or more subsequent uplink transmissions includes control channel information that provides information on the one or more subsequent uplink transmissions.

A method of wireless communication is described. The method may include receiving RRC signaling including an autonomous uplink configuration for unscheduled autonomous uplink transmissions in a shared radio frequency spectrum band, receiving DCI that activates autonomous uplink transmissions, contending for access to a channel of the shared radio frequency spectrum band in accordance with the autonomous uplink configuration, and transmitting one or more autonomous uplink transmissions over the channel of the shared radio frequency spectrum band in accordance with the autonomous uplink configuration.

An apparatus for wireless communication is described. The apparatus may include means for receiving RRC signaling including an autonomous uplink configuration for unscheduled autonomous uplink transmissions in a shared radio frequency spectrum band, means for receiving DCI that activates autonomous uplink transmissions, means for contending for access to a channel of the shared radio frequency spectrum band in accordance with the autonomous uplink configuration, and means for transmitting one or more autonomous uplink transmissions over the channel of the shared radio frequency spectrum band in accordance with the autonomous uplink configuration.

Another apparatus for wireless communication is described. The apparatus may include a processor, memory in electronic communication with the processor, and instructions stored in the memory. The instructions may be operable to cause the processor to receive RRC signaling including an autonomous uplink configuration for unscheduled autonomous uplink transmissions in a shared radio frequency spectrum band, receive DCI that activates autonomous uplink transmissions, contend for access to a channel of the shared radio frequency spectrum band in accordance with the autonomous uplink configuration, and transmit one or more autonomous uplink transmissions over the channel of the shared radio frequency spectrum band in accordance with the autonomous uplink configuration.

A non-transitory computer readable medium for wireless communication is described. The non-transitory computer-readable medium may include instructions operable to cause a processor to receive RRC signaling including an autonomous uplink configuration for unscheduled autonomous uplink transmissions in a shared radio frequency spectrum band, receive DCI that activates autonomous uplink transmissions, contend for access to a channel of the shared radio frequency spectrum band in accordance with the autonomous uplink configuration, and transmit one or more autonomous uplink transmissions over the channel of the shared radio frequency spectrum band in accordance with the autonomous uplink configuration.

Some examples of the method, apparatus, and non-transitory computer-readable medium described above may further include processes, features, means, or instructions for receiving subsequent DCI that deactivates autonomous uplink transmissions, and discontinuing contending for access to the channel of the shared radio frequency spectrum band responsive to the receiving the subsequent DCI that deactivates autonomous uplink transmissions.

In some examples of the method, apparatus, and non-transitory computer-readable medium described above, the DCI comprises a CRC field scrambled with an identifier, and a value of the identifier indicates that the DCI is associated with autonomous uplink transmissions.

In some examples of the method, apparatus, and non-transitory computer-readable medium described above, the autonomous uplink configuration enables autonomous uplink transmissions on one or more transmit antennas according to a MIMO configuration.

A method of wireless communication is described. The method may include identifying an autonomous uplink configuration for unscheduled uplink transmissions in a shared radio frequency spectrum band, contending for access to a channel of the shared radio frequency spectrum band in accordance with the autonomous uplink configuration, determining uplink control information and uplink shared channel information for an uplink transmission to be transmitted over the channel of the shared radio frequency spectrum band, rating matching the uplink shared channel information around the uplink control information in the uplink transmission, and transmitting the uplink transmission over the channel of the shared radio frequency spectrum band in accordance with the autonomous uplink configuration.

An apparatus for wireless communication is described. The apparatus may include means for identifying an autonomous uplink configuration for unscheduled uplink transmissions in a shared radio frequency spectrum band, means for contending for access to a channel of the shared radio frequency spectrum band in accordance with the autonomous uplink configuration, means for determining uplink control information and uplink shared channel information for an uplink transmission to be transmitted over the channel of the shared radio frequency spectrum band, means for rating matching the uplink shared channel information around the uplink control information in the uplink transmission, and means for transmitting the uplink transmission over the channel of the shared radio frequency spectrum band in accordance with the autonomous uplink configuration.

Another apparatus for wireless communication is described. The apparatus may include a processor, memory in electronic communication with the processor, and instructions stored in the memory. The instructions may be operable to cause the processor to identify an autonomous uplink configuration for unscheduled uplink transmissions in a shared radio frequency spectrum band, contend for access to a channel of the shared radio frequency spectrum band in accordance with the autonomous uplink configuration, determine uplink control information and uplink shared channel information for an uplink transmission to be transmitted over the channel of the shared radio frequency spectrum band, rate matching the uplink shared channel information around the uplink control information in the uplink transmission, and transmit the uplink transmission over the channel of the shared radio frequency spectrum band in accordance with the autonomous uplink configuration.

A non-transitory computer readable medium for wireless communication is described. The non-transitory computer-readable medium may include instructions operable to cause a processor to identify an autonomous uplink configuration for unscheduled uplink transmissions in a shared radio frequency spectrum band, contend for access to a channel of the shared radio frequency spectrum band in accordance with the autonomous uplink configuration, determine uplink control information and uplink shared channel information for an uplink transmission to be transmitted over the channel of the shared radio frequency spectrum band, rate matching the uplink shared channel information around the uplink control information in the uplink transmission, and transmit the uplink transmission over the channel of the shared radio frequency spectrum band in accordance with the autonomous uplink configuration.

In some examples of the method, apparatus, and non-transitory computer-readable medium described above, the resources used for the uplink control information and rate matching of the shared channel information may be configured in the autonomous uplink configuration.

In some examples of the method, apparatus, and non-transitory computer-readable medium described above, a payload size of the uplink control information may be a fixed size configured in the autonomous uplink configuration. In some examples of the method, apparatus, and non-transitory computer-readable medium described above, the payload size may be independent of a number of subframes of the uplink transmission.

In some examples of the method, apparatus, and non-transitory computer-readable medium described above, the uplink control information comprises one or more of a HARQ identification, a burst length of the uplink transmission, a MCOT, a RV indication, a NDI, or a UE identifier. In some examples of the method, apparatus, and non-transitory computer-readable medium described above, the uplink control information comprises a time difference between a maximum channel occupancy time (MCOT) and a duration of a burst length of the uplink transmission.

A method of wireless communication is described. The method may include identifying an autonomous uplink configuration for unscheduled uplink transmissions in a shared radio frequency spectrum band, receiving A-DCI associated with one or more autonomous uplink transmissions, and transmitting an autonomous uplink transmission over the shared radio frequency spectrum band in accordance with the autonomous uplink configuration and the A-DCI.

An apparatus for wireless communication is described. The apparatus may include means for identifying an autonomous uplink configuration for unscheduled uplink transmissions in a shared radio frequency spectrum band, means for receiving A-DCI associated with one or more autonomous uplink transmissions, and means for transmitting an autonomous uplink transmission over the shared radio frequency spectrum band in accordance with the autonomous uplink configuration and the A-DCI.

Another apparatus for wireless communication is described. The apparatus may include a processor, memory in electronic communication with the processor, and instructions stored in the memory. The instructions may be operable to cause the processor to identify an autonomous uplink configuration for unscheduled uplink transmissions in a shared radio frequency spectrum band, receive A-DCI associated with one or more autonomous uplink transmissions, and transmit an autonomous uplink transmission over the shared radio frequency spectrum band in accordance with the autonomous uplink configuration and the A-DCI.

A non-transitory computer readable medium for wireless communication is described. The non-transitory computer-readable medium may include instructions operable to cause a processor to identify an autonomous uplink configuration for unscheduled uplink transmissions in a shared radio frequency spectrum band, receive A-DCI associated with one or more autonomous uplink transmissions, and transmit an autonomous uplink transmission over the shared radio frequency spectrum band in accordance with the autonomous uplink configuration and the A-DCI.

In some examples of the method, apparatus, and non-transitory computer-readable medium described above, the A-DCI comprises a bitmap of feedback information associated with one or more feedback processes associated with one or more autonomous uplink transmission. In some examples of the method, apparatus, and non-transitory computer-readable medium described above, the feedback information comprises one or more ACK/NACK indications for one or more HARQ processes. In some examples of the method, apparatus, and non-transitory computer-readable medium described above, the bits from two or more feedback processes may be bundled.

In some examples of the method, apparatus, and non-transitory computer-readable medium described above, the A-DCI may include uplink power control information for one or more autonomous uplink transmission. In some examples, a medium access control (MAC) control element (CE) may include the uplink power control information for one or more autonomous uplink transmission and be transmitted over a shared channel transmission. In some examples of the method, apparatus, and non-transitory computer-readable medium described above, the MAC-CE includes a CQI or a MCS indicator, and an acknowledgment may be transmitted that the CQI or MCS are successfully received.

DETAILED DESCRIPTION

Figure 1:
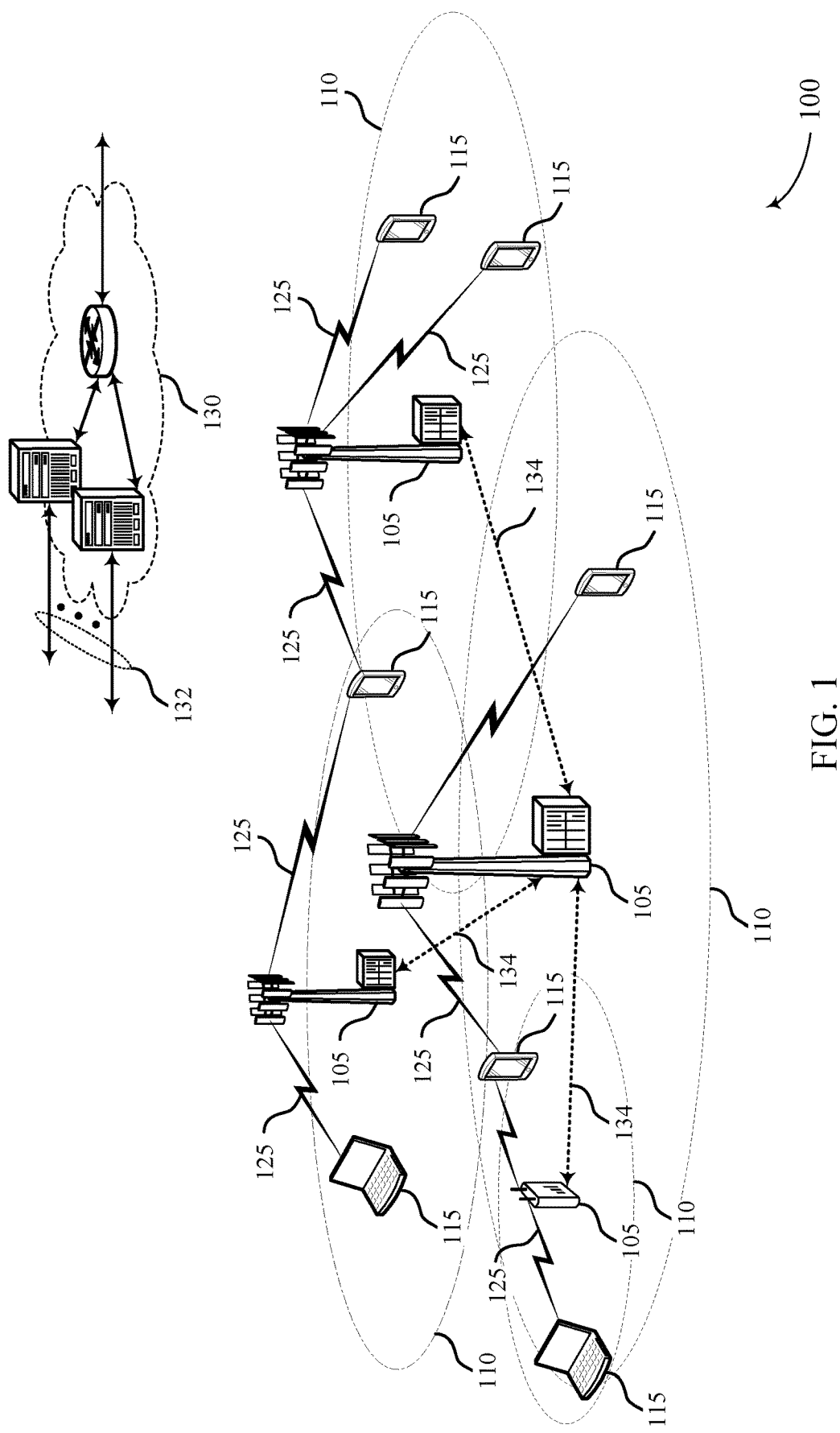
FIG. 1 illustrates an example of a system for wireless communication that supports autonomous uplink transmission techniques using shared radio frequency spectrum in accordance with aspects of the present disclosure.

The described techniques relate to improved methods, systems, devices, or apparatuses that support autonomous uplink transmissions using shared or unlicensed radio frequency spectrum. Generally, the described techniques provide for efficient coordination of autonomous uplink transmissions, and associated downlink transmissions through various signals, control information, waveform modification, or combinations thereof.

In some examples, unlicensed radio frequency spectrum bands may be used for Long Term Evolution (LTE) or LTE-Advanced (LTE-A) communications. Unlicensed radio frequency spectrum may be used in combination with, or independent from, a dedicated or licensed radio frequency spectrum band. The dedicated radio frequency spectrum band may include a radio frequency spectrum band licensed to particular users for particular uses. The unlicensed or shared radio frequency spectrum band may include a radio frequency spectrum band available for Wi-Fi use, a radio frequency spectrum band available for use by different radio access technologies, or a radio frequency spectrum band available for use by multiple mobile network operators (MNOs) in an equally shared or prioritized manner. The terms unlicensed radio frequency spectrum and shared radio frequency spectrum are used interchangeably herein.

Wireless communications systems that support autonomous uplink coordination using shared radio frequency spectrum may use a listen-before-talk (LBT) procedure to resolve user equipment (UE) ambiguity and to mitigate potential for collisions that may arise in scenarios where un-scheduled wireless systems coexist with scheduled wireless systems (such as a MuLTEfire system). In the LBT procedure according to an autonomous uplink transmission configuration, a UE may monitor a medium for a defined time period to detect activity from other intra-cell UEs. If the UE does not detect any activity during the LBT procedure (e.g., a clear channel assessment), the UE may transmit a busy signal until the next subframe, and may begin transmitting uplink data (e.g., using a physical uplink shared channel (PUSCH)) multiplexed with or shortly after an autonomous physical uplink control channel (A-PUCCH) transmission.

In some examples, a UE may have data that is to be transmitted according to an autonomous uplink (AUL) configuration, and may determine a duration of the associated uplink transmission. Upon performing channel contention and gaining access to the shared radio frequency spectrum band, the UE may modify an uplink waveform or provide an indication to a base station of one or more channel resources that may be available for base station transmissions, in order to more fully utilize shared radio frequency spectrum band resources within a maximum channel occupancy time (MCOT). In some cases, a base station may configure a UE to perform AUL transmissions, and may activate or deactivate AUL transmissions based on various factors (e.g., channel conditions, traffic at the base station, etc.) through downlink control information (DCI) transmitted to the UE. In some examples, a cyclic redundancy check (CRC) of the DCI may be scrambled with an identification that indicates whether AUL transmissions are activated or deactivated at the UE. In some cases, the UE and base station may exchange various other control information to provide relatively efficient autonomous uplink transmissions and use of the shared radio frequency spectrum band resources, as discussed herein.

Aspects of the disclosure are initially described in the context of a wireless communications system. Further examples are then provided of AUL configurations and timelines. Aspects of the disclosure are further illustrated by and described with reference to apparatus diagrams, system diagrams, and flowcharts that relate to autonomous uplink transmission techniques using shared radio frequency spectrum.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a LTE (or LTE-Advanced) network, or a New Radio (NR) network. In some cases, wireless communications system 100 may support enhanced broadband communications, ultra-reliable (i.e., mission critical) communications, low latency communications, and communications with low-cost and low-complexity devices. Wireless communications system 100 may be an example of a system that supports autonomous uplink transmissions by UEs 115.

Base stations 105 may wirelessly communicate with UEs 115 via one or more base station antennas. Each base station 105 may provide communication coverage for a respective geographic coverage area 110. Communication links 125 shown in wireless communications system 100 may include uplink (UL) transmissions from a UE 115 to a base station 105, or downlink (DL) transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communications system may be configured to provide ultra-reliable communications for these functions.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

Aspects of wireless communications system 100 may be configured as a MuLTEFire network, and an access point (AP) may be configured as a MuLTEFire eNB or base station 105. Wireless communications system 100 may include aspects of an LTE/LTE-A network, a Wi-Fi network, a MuLTEFire network, a neutral host small cell network, or the like, operating with overlapping coverage areas. A MuLTEFire network may include APs and/or base stations 105 communicating with UEs 115 in unlicensed radio frequency spectrum band, e.g., without a licensed radio frequency anchor carrier. For example, the MuLTEFire network may operate without an anchor carrier in licensed radio frequency spectrum.

In some cases, UE 115 and base station 105 may operate in a shared radio frequency spectrum band, which may include licensed RF spectrum, unlicensed RF spectrum, or a combination of licensed and unlicensed RF spectrum. For example, wireless communications system 100 may employ LTE License Assisted Access (LTE-LAA) or LTE Unlicensed (LTE U) radio access technology or NR technology in an unlicensed band such as the 5 GHz Industrial, Scientific, and Medical (ISM) band. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform an LBT procedure such as a clear channel assessment (CCA) prior to communicating in order to determine whether the shared channel is available. In some cases, AUL transmissions may follow similar LBT rules as used for grant-based uplink transmissions, such as category 4 LBT rules.

A CCA may include an energy detection or energy sensing procedure to determine whether there are any other active transmissions. For example, each UE 115 may randomly choose a backoff counter (with may be a certain duration or a number of symbols) and listen to a channel including resources the UEs 115 are contending for until the counter decrements to zero. If the counter reaches zero for a certain UE 115 and no other transmissions are detected, the UE 115 may start transmitting. If the counter does not reach zero before another signal is detected, the UE 115 has lost contention for resource and refrains from transmitting.

In some examples, a UE 115 may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. UEs 115 may be dispersed throughout the wireless communications system 100, and each UE 115 may be stationary or mobile. Although a base station 105 may generally refer to aspects of wireless wide area networks (WWANs) and an AP may generally refer to aspects of WLANs, base station and AP may be used interchangeably. As discussed below, a base station 105 may identify conditions (e.g., number of hidden nodes) of a UE 115, and the core network 130, via base station 105, may configure the UE 115 accordingly.

UEs 115 and base stations 105 may employ a hybrid automatic repeat request (HARQ) feedback mechanism, which may be a method of ensuring that data is received correctly over a communication link 125. HARQ may include a combination of error detection (e.g., using a cyclic redundancy check (CRC), forward error correction (FEC), and retransmission (e.g., automatic repeat request (ARQ)). HARQ may improve throughput at the media access control (MAC) layer in poor radio conditions (e.g., signal-to-noise conditions). In Incremental Redundancy HARQ, incorrectly received data may be stored in a buffer and combined with subsequent transmissions to improve the overall likelihood of successfully decoding the data. In some cases, redundancy bits (e.g., a redundancy version (RV) or a new data indicator (NDI)) are added to each message prior to transmission. This may be useful in poor conditions. In other cases, redundancy bits are not added to each transmission, but are retransmitted after the transmitter of the original message receives a negative acknowledgement (NACK) indicating a failed attempt to decode the information. The chain of transmission, response and retransmission may be referred to as a HARQ process. In some cases, a limited number of HARQ processes may be used for a given communication link 125.

In some examples, unscheduled PUSCH transmissions may use asynchronous HARQ processes, and certain retransmission options may be used. For example, a UE 115 may send a retransmission upon receipt of a NACK, where a base station 105 may win contention for the medium to send the NACK feedback. Additionally or alternatively, retransmission may be based on receipt of NACK or a timer when no ACK/NACK feedback is received. In some cases, the timer may increase the chance of a PUSCH being received.

Bidirectional communications may use frequency division duplexing (FDD) (e.g., using paired spectrum resources) or time division duplexing (TDD) operation (e.g., using unpaired spectrum resources). Frame structures for FDD (e.g., frame structure type 1) and TDD (e.g., frame structure type 2) may be defined. For TDD frame structures, each subframe may carry uplink or downlink traffic, and special subframes may be used to switch between downlink and uplink transmission. Allocation of uplink and downlink subframes within radio frames may be symmetric or asymmetric and may be statically determined or may be reconfigured semi-statically. Special subframes may carry downlink or uplink traffic and may include a guard period (GP) between downlink and uplink traffic. Switching from uplink to downlink traffic may be achieved by setting a timing advance at the UE 115 without the use of special subframes or a guard period. Uplink-downlink configurations with switch-point periodicity equal to the frame period (e.g., 10 ms) or half of the frame period (e.g., 5 ms) may also be supported.

For example, TDD frames may include one or more special frames, and the period between special frames may determine the TDD DL-to-UL switch-point periodicity for the frame. Use of TDD offers flexible deployments without requiring paired UL-DL spectrum resources. In some TDD network deployments, interference may be caused between uplink and downlink communications (e.g., interference between uplink and downlink communication from different base stations, interference between uplink and downlink communications from base stations and UEs, etc.). For example, where different base stations 105 serve different UEs 115 within overlapping coverage areas according to different TDD UL-DL configurations, a UE 115 attempting to receive and decode a downlink transmission from a serving base station 105 may experience interference from uplink transmissions from other, proximately located UEs 115.

In some cases, a UE 115 may be detectable by a central base station 105 (or AP), but not by other UEs 115 in the coverage area 110 of the central base station 105. For example, one UE 115 may be at one end of the coverage area 110 of the central base station 105 while another UE 115 may be at the other end (e.g., a hidden node). Thus, both UEs 115 may communicate with the base station 105, but may not receive the transmissions of the other. This may result in colliding transmissions for the two UEs 115 in a contention based environment (e.g., carrier sense multiple access with collision avoidance (CSMA/CA)) because the UEs 115 may not refrain from transmitting on top of each other. A UE 115 whose transmissions are not identifiable, but that is within the same coverage area 110 may be known as a hidden node. In some examples described herein, a UE 115 and base station 105 of interest may be referred to as a victim UE 115 or victim AP in the presence of a potentially interfering neighbor UE 115 or AP (e.g., a hidden node), which may be further referred to as an aggressor UE 115 or aggressor AP.

In some cases, intra-cell UE ambiguity and transmission collisions may result in decreased system performance (e.g. due to timing synchronization issues). Intra-cell UE ambiguity and/or transmission collisions may arise in scenarios where two or more UEs 115 are unable to detect each other (e.g. the hidden node issue described above). In some cases, a grant may be used by a base station 105 to allocate resources to UEs 115. In AUL, the base station 105 may detect the presence of the PUSCH and identify a UE 115 through a DMRS or scheduling request (SR). After one AUL UE 115 successfully contends the medium, the base station 105 may detect its PUSCH. However, since other intra-cell UEs 115 may not detect the DMRS and SR from this UE 115, another intra-cell UE (e.g., an aggressor) may also successfully contend the medium. As a result, the base station 105 may have a misaligned TDD configuration and frame start-timing, which may result in a collision between the transmissions from the two UEs 115. In some cases, a base station may enable or disable AUL transmissions at a UE 115 to reduce the likelihood of interference between multiple AUL transmissions, as will be discussed in further detail below.

Time intervals may be expressed in multiples of a basic time unit (which may be a sampling period of $T_s=1/30,720,000$ seconds). Time resources may be organized according to radio frames of length of 10 ms ($T_f=307200T_s$), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol may contain 2048 sample periods. However, in some cases as described below, symbols within wireless communications system 100 may also have different durations. In some cases the subframe may be the smallest scheduling unit, also known as a TTI. In other cases, a TTI may be shorter than a subframe or may be dynamically selected (e.g., in short TTI bursts or in selected component carriers using short TTIs).

Each frame may include ten 1 ms subframes numbered from 0 to 9; other frame structures may also be employed, as discussed below. A subframe may be further divided into two 0.5 ms slots, each of which contains 6 or 7 modulation symbol periods (depending on the length of the cyclic prefix prepended to each symbol). A resource element may consist of one symbol period and one subcarrier (a 15 KHz frequency range). A resource block may contain 12 consecutive subcarriers in the frequency domain and, for a normal cyclic prefix in each orthogonal frequency division multiplexing (OFDM) symbol, 7 consecutive OFDM symbols in the time domain (1 slot), or 84 resource elements.

Excluding the cyclic prefix, each symbol may contain 2048 sample periods. In some cases the subframe may be the smallest scheduling unit, also known as a transmission time interval. In other cases, a TTI may be shorter than a subframe or may be dynamically selected (e.g., in short TTI bursts or in selected component carriers using short TTIs). A subframe may have different structures depending on the type and direction of information to be transmitted. A subframe type may be an uplink subframe, a downlink subframe, or a special (S) subframe. Special subframes may facilitate a switch from downlink to uplink transmission. Further the structure of a subframe may vary in terms of length. Other frame structures may also be employed in wireless communications system 100. In some cases, wireless communications system 100 may be organized by transmission opportunities (TxOPs), which may be organized according to the frame structure described above and which a may be separated by periods of time during which the wireless medium may be unavailable for devices (e.g., UEs 115 or base stations 105) within wireless communications system 100.

In some cases, wireless communications system 100 may utilize enhanced component carriers (eCCs). An eCC may be characterized by one or more features including: wider bandwidth, shorter symbol duration, shorter transmission time interval (TTIs), and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other CCs, which may include use of a reduced symbol duration as compared with symbol durations of the other CCs. A shorter symbol duration may be associated with increased subcarrier spacing. A TTI in an eCC may consist of one or multiple symbols. In some cases, the TTI duration (that is, the number of symbols in a TTI) may be variable. A device, such as a UE 115 or base station 105, utilizing eCCs may transmit wideband signals (e.g., 20, 40, 60, 80 MHz, etc.) at reduced symbol durations (e.g., 16.67 microseconds). A TTI in eCC may consist of one or multiple symbols. In some cases, the TTI duration (that is, the number of symbols in a TTI) may be variable.

As indicated above, one or more UEs 115 may operate in an autonomous (i.e., unscheduled) uplink mode. When operating in an AUL mode, UEs 115 may use an autonomous control channel (e.g., A-PUCCH) configuration. These A-PUCCH configurations may be configured according to UE 115 or system needs or constraints in various examples.

In some cases, wireless communications system 100 may support different uplink transmission configurations for different UEs 115 (e.g., mixed mode scheduling). That is, a first UE 115 may operate using AUL transmissions (which may be used in addition to scheduled uplink transmissions) and other UEs 115 may use scheduled uplink transmissions. Such mixed-mode scheduling may be associated with enhanced communications performance within the system, and a base station 105 may enable or disable AUL transmissions at different UEs 115 to provide such mixed-mode scheduling. As a result, configurations for UEs 115 that may operate using unscheduled and/or scheduled uplink transmissions may be determined by a serving base station 105.

A UE 115 configured for AUL may, in some examples, perform channel contention and gain access to a shared radio frequency spectrum band, according to an AUL configuration that may be provided to the UE 115 by a base station 105. In some cases, the UE 115 may modify an uplink waveform or provide an indication to the base station 105 of one or more channel resources that may be available for base station 150 transmissions, in order to more fully utilize shared radio frequency spectrum band resources within a MCOT. In some examples, a CRC of a DCI may be scrambled with an identification that indicates whether AUL transmissions are activated or deactivated at a particular UE 115. In some cases, the UE 115 and base station 105 may exchange various other control information to provide relatively efficient autonomous uplink transmissions and use of the shared radio frequency spectrum band resources, as discussed herein.

Figure 2:
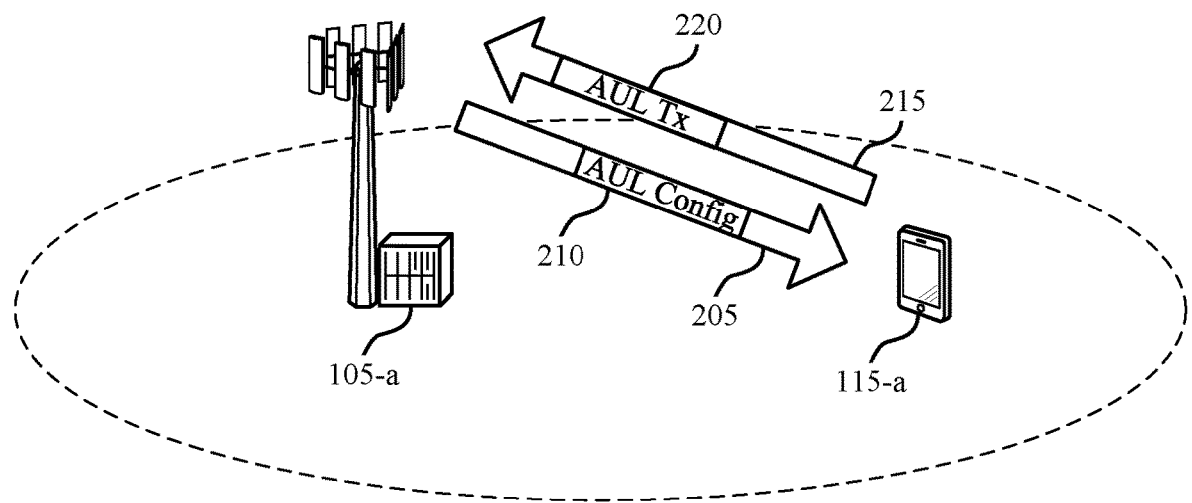
FIG. 2 illustrates an example of a wireless communications system that supports autonomous uplink transmission techniques using shared radio frequency spectrum in accordance with aspects of the present disclosure.

FIG. 2 illustrates an example of a wireless communications system 200 that supports autonomous uplink transmission techniques using shared radio frequency spectrum in accordance with various aspects of the present disclosure. Wireless communications system 200 may include a base station 105-a and UE 115-a that may be examples of the corresponding devices described with reference to FIG. 1. For example, UE 115-a may be time-synchronized with base station 105-a, and may be capable of unscheduled or AUL transmissions to base station 105-a. In some examples, the base station 105-a may enable the UE 115-a for AUL transmissions through downlink transmissions 205 (e.g., RRC signaling) that includes AUL configuration information 210. The UE 115-a may perform a contention procedure to gain channel access, and may transmit uplink transmissions 215 which may contain AUL transmissions 220.

In wireless communications system 200, as described in more detail below, the AUL transmissions 220 and associated control information may be transmitted between base station 105-a and UE 115-a in a manner that provides enhanced efficiency shared resources such as resources of a shared radio frequency spectrum band. For example, UE 115-a may have data that is to be transmitted using an AUL transmission 220, and may determine that data to be transmitted in the AUL transmission spans less than a total duration of the transmission opportunity (TxOP) acquired by the UE 115-a as part of the channel contention process. In such cases, the UE 115-a may signal to the base station 105-a a number of subframes of the TxOP that are unused, and that may then be used by the base station 105-a. In such a manner, both the UE 115-a and the base station 105-a may more efficiently use the shared resources and increase system throughput and efficiency. In some cases, the AUL transmission 220 may occupy the entire TxOP or nearly the entire TxOP, and the UE 115-a may modify a waveform of the AUL transmission in order to provide a gap during which the base station 105-a may perform an LBT procedure.

Figure 3:
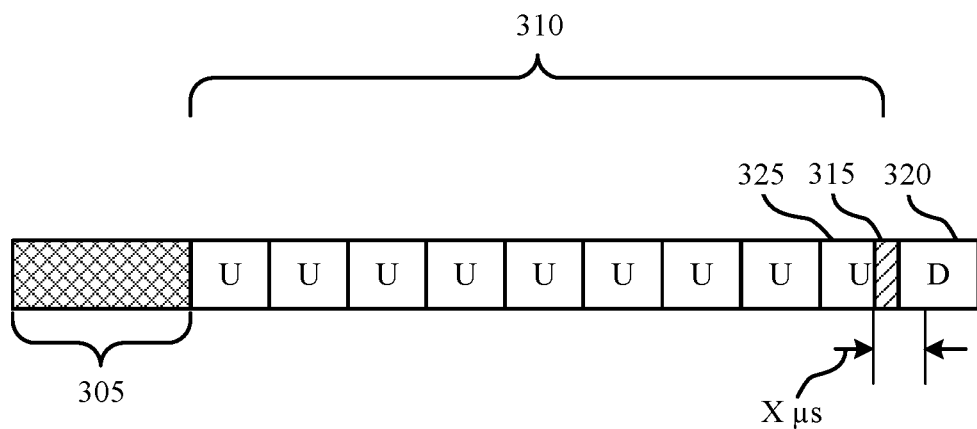
FIG. 3 illustrates an example of shared channel resources that supports autonomous uplink transmission techniques using shared radio frequency spectrum in accordance with aspects of the present disclosure.

An example of such a gap is illustrated in FIG. 3, which illustrates an example of shared channel resources 300 that support autonomous uplink transmission techniques using shared radio frequency spectrum in accordance with various aspects of the present disclosure. Shared channel resources 300 may be utilized by base stations 105 and UEs 115 as described with reference to FIGS. 1 and 2.

As indicated above, in some cases it may be desirable to provide a gap between an AUL transmission and a subsequent downlink transmission of a base station, during which the base station may perform a LBT procedure. Furthermore, in some cases, regulations associated with shared channel contention procedures may specify a maximum gap between transmissions between a UE and a base station. For example, ETSI regulations specify a maximum gap of 25 µs between base station and UE transmissions, and in some cases a base station may transmit a cell-specific reference signal (CRS) in a first symbol of a downlink transmission that the UE may use to detect transmission from the base station.

With reference to the shared channel resources 300 of FIG. 3, the UE may perform a CCA 305 and gain access to the shared channel resources 300, and may transmit AUL transmission 310. Synchronized timing in the system may provide that a downlink transmission starts in a first downlink subframe 320 that is subsequent to a last uplink subframe 325. As indicated above, the UE may leave a gap 315 between the last uplink subframe 325 and the first downlink subframe 320 during which the base station may perform channel contention. Further, a maximum time period (e.g., X µs) may be specified in certain cases. Additionally, the UE may apply a timing advance (TA) when transmitting uplink transmissions, so as to provide uplink transmissions that arrive at the base station and provide system synchronization. The TA may be used to compensate for propagation delay of the AUL transmission 310 between the UE and the base station, and may be determined by the UE according to established techniques for determining TA.

In such examples, a UE may modify the uplink transmission waveform, or provide signaling to a base station, that provides the gap 315 and also complies with any specified maximum time gap. In some examples, the UE may generate an uplink waveform that spans the entire duration of the AUL transmission 310, and then puncture the last (X-TA) μs of the AUL transmission 310 in the last symbol of the last downlink subframe 325. In other examples, the UE may generate an uplink waveform that spans a time that is one symbol less than the entire duration of the AUL transmission 310, and may cyclically extend sample of the last symbol of the waveform (X-TA) μs before the boundary of the first downlink subframe 320. In some examples, if the TA is more than X μs, then the base station may performs the channel contention procedure and transmit a reservation signal for TA μs until the boundary of the first downlink subframe 320. In some cases, autonomous uplink control information (A-UCI) may be transmitted in the AUL transmission 310, and in such cases, if A-UCI is transmitted in the last uplink subframe 325, then the physical channel carrying A-UCI (A-PUCCH for example) is not defined for the last symbol of the last uplink subframe, and may thus be reliably transmitted without being punctured. The base station may then perform a X μs CCA to start the downlink transmission at the first downlink subframe 320.

Figure 4:
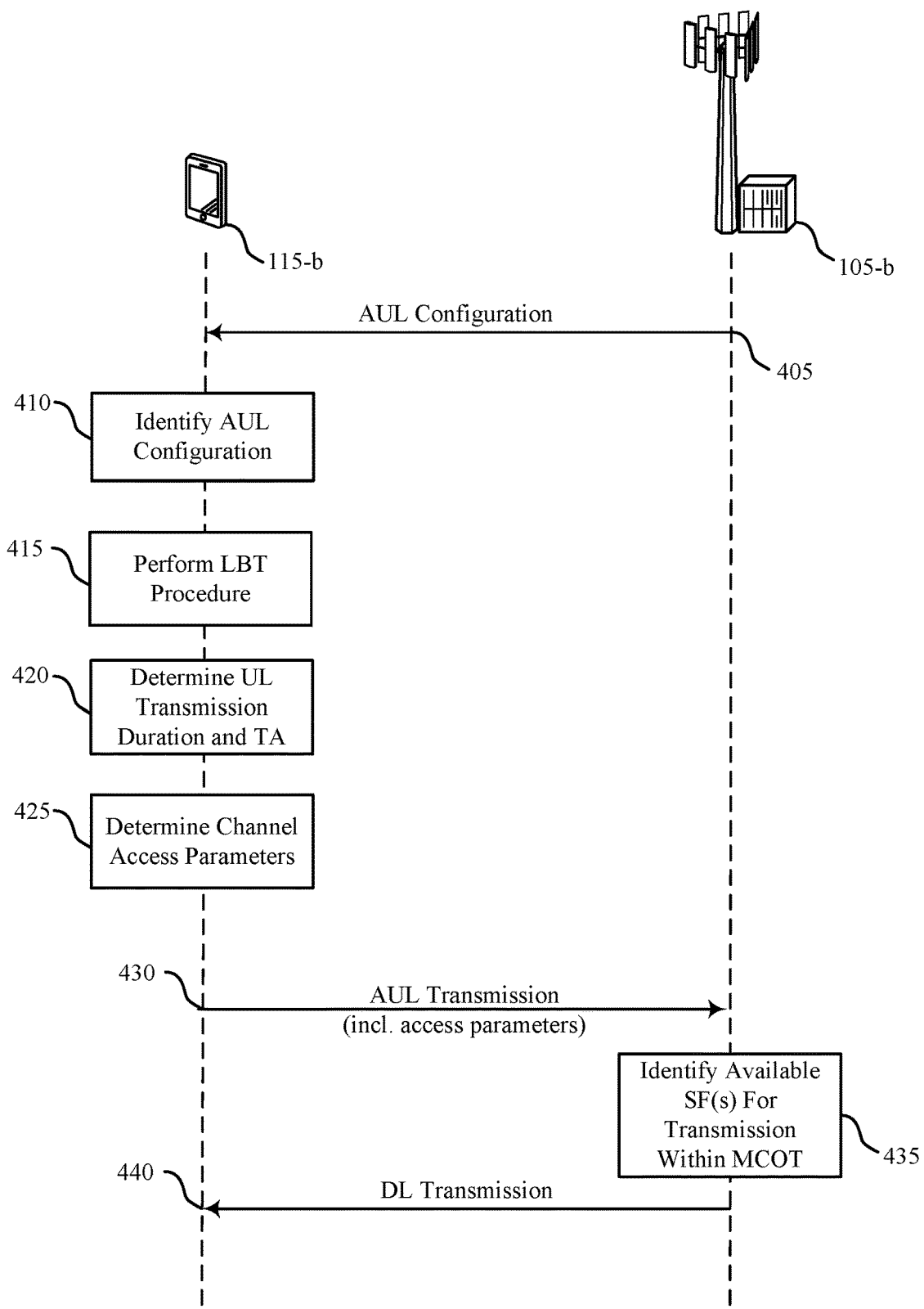
FIG. 4 illustrates an example of a process flow that supports autonomous uplink transmission techniques using shared radio frequency spectrum in accordance with aspects of the present disclosure.

FIG. 4 illustrates an example of a process flow 400 that supports autonomous uplink transmission techniques using shared radio frequency spectrum in accordance with various aspects of the present disclosure. Process flow 400 may include a UE 115-b and base station 105-b, which may be respective examples of a UE 115 and a base station 105 as described herein with reference to FIGS. 1-2. Process flow 400 may be an example of the use of different autonomous uplink transmission techniques, where UE 115-b may transmit one or more channel access parameters that may be used by base station 105-a to opportunistically transmit one or more downlink transmissions within a UE-acquired MCOT.

The base station 105-b may determine an AUL configuration for the UE 115-b, and may transmit the AUL configuration 405 in a downlink transmission to the UE 115-b. In some cases, the AUL configuration 405 may be transmitted using RRC signaling.

At block 410, the UE 115-b may identify the AUL configuration and, based on the AUL configuration, may identify that data is to be transmitted to the base station 105-b using one or more AUL transmissions. In some cases, the AUL configuration may include a time period during which the UE 115-b may transmit AUL transmissions, and provide various parameters (e.g., MCS, uplink power control parameters, etc.). In some cases, the AUL configuration may include information on a type of channel contention procedure that may be performed by the UE 115-b, such as a Cat-4 or a Cat-2 LBT, for example.

At block 415, the UE 115-b may perform an LBT procedure in accordance with the AUL configuration. In some cases, the UE 115-b may perform a CCA in order to confirm that a channel of a shared radio frequency spectrum band is unoccupied by another transmitter, in a manner similarly as discussed above. In some cases, the LBT procedure may be successful and the UE 115-b may gain channel access and may identify a MCOT associated with the AUL transmissions. In some cases, the AUL configuration may provide that the UE 115-b acquires the channel of the shared radio frequency spectrum band according to a MCOT acquired by the base station 105-b. In other cases, the AUL configuration may provide that the UE 115-b may acquire its own MCOT as part of the LBT procedure 415. In cases where the UE 115-b may perform a Cat-4 LBT and acquire its own MCOT, the timing for starting the LBT may be up to UE 115-b implementation, and the MCOT may be determined by the UE 115-b. In some cases, the UE 115-b may decide the LBT priority class, and where MCOT is acquired by the UE 115-b a portion of the MCOT may be shared with the base station 105-b.

At block 420, the UE 115-b may determine an uplink transmission duration and a TA for the AUL transmission. The uplink transmission duration may be determined, for example, based on an amount of data to be transmitted in the AUL transmission, a time period available for the AUL transmission, a MCS for AUL transmissions, or any combination thereof. In some cases, the TA may be identified based on a propagation delay for a signal transmitted between the UE 115-b and the base station 105-b, according to established TA determination techniques.

At block 425, the UE 115-b may determine channel access parameters associated with the AUL transmission, and may transmit AUL transmission 430, including the access parameters, to the base station 105-b. As indicated above, in some cases that UE 115-b may acquire the MCOT, and may share the MCOT with the base station 105-b. In such cases, the channel access parameters may include an indication that the base station 105-b may share the MCOT. In some cases, LBT priority class as part of the channel access parameters, and the base station 105-b may use portions of the MCOT that are unused by the UE 115-b. In some cases, the base station may not be able to autonomously estimate the exact duration of AUL transmission 430, such as due to burst interference at reception for example, and thus signaling LBT priority class as part of the channel access parameters may not allow the base station 105-b to reliably estimate available resources that may be used for downlink transmissions. Thus, in some examples, the channel access parameters may include a number of subframes that can be used by the base station 105-b within the UE 115-b acquired TxOP.

In some cases, the channel access parameters may be signaled to the base station 105-b in uplink control information (A-UCI) provided in the AUL transmission 430. In some cases, the channel access parameters may include an indication associated with the gap between uplink transmissions and a subframe boundary of a subsequent downlink transmission, which may allow the base station 105-b to, for example, initiate a LBT procedure during the gap. In some examples, the base station 105-b may transmit downlink transmissions within the UE-acquired TxOP, but may not share the UE-acquired TxOP with other UEs in the system.

At block 435, the base station 105-b may identify subframes available for a subsequent downlink transmission. Such a determination may be made according to the channel access parameters provided by the UE 115-b, for example, as discussed above. The base station 105-b may then transmit one or more downlink transmissions 440 to the UE 115-b.

In some examples, the UE 115-b may have more data to be transmitted in AUL transmissions than may fit in the resources acquired by the UE 115-b. In some examples, if the UE 115-b has more data to transmit, the AUL configuration may provide that UE 115-b may continue AUL transmissions in certain cases. In some cases, the AUL configuration may provide for UE 115-b scheduling in Mode 1 that provides scheduling within a base station 105-b acquired MCOT, or in Mode 2 that provides for UE-acquired MCOT with Cat-4 LBT (which may be converted to Mode 1 if the base station 105-b obtains channel access at least a subframe or two before the UE 115-b can transmit). If the UE 115-b continues beyond it scheduled subframes in Mode 1, then it may interfere with transmissions from other UEs unless explicitly signaled otherwise. Thus, in some examples, the UE 115-b may be allowed to continue AUL transmissions in Mode 2 when the UE performs Cat 4 LBT. The first subframe of the subsequent AUL transmission in such cases may include A-PUCCH signaling that may indicate that the UE 115-*b* is continuing AUL transmissions. In some cases, the AUL transmissions 430 may be MIMO transmissions, and the AUL configuration may provide for Rank 2 uplink MIMO AUL transmissions.

Figure 5:
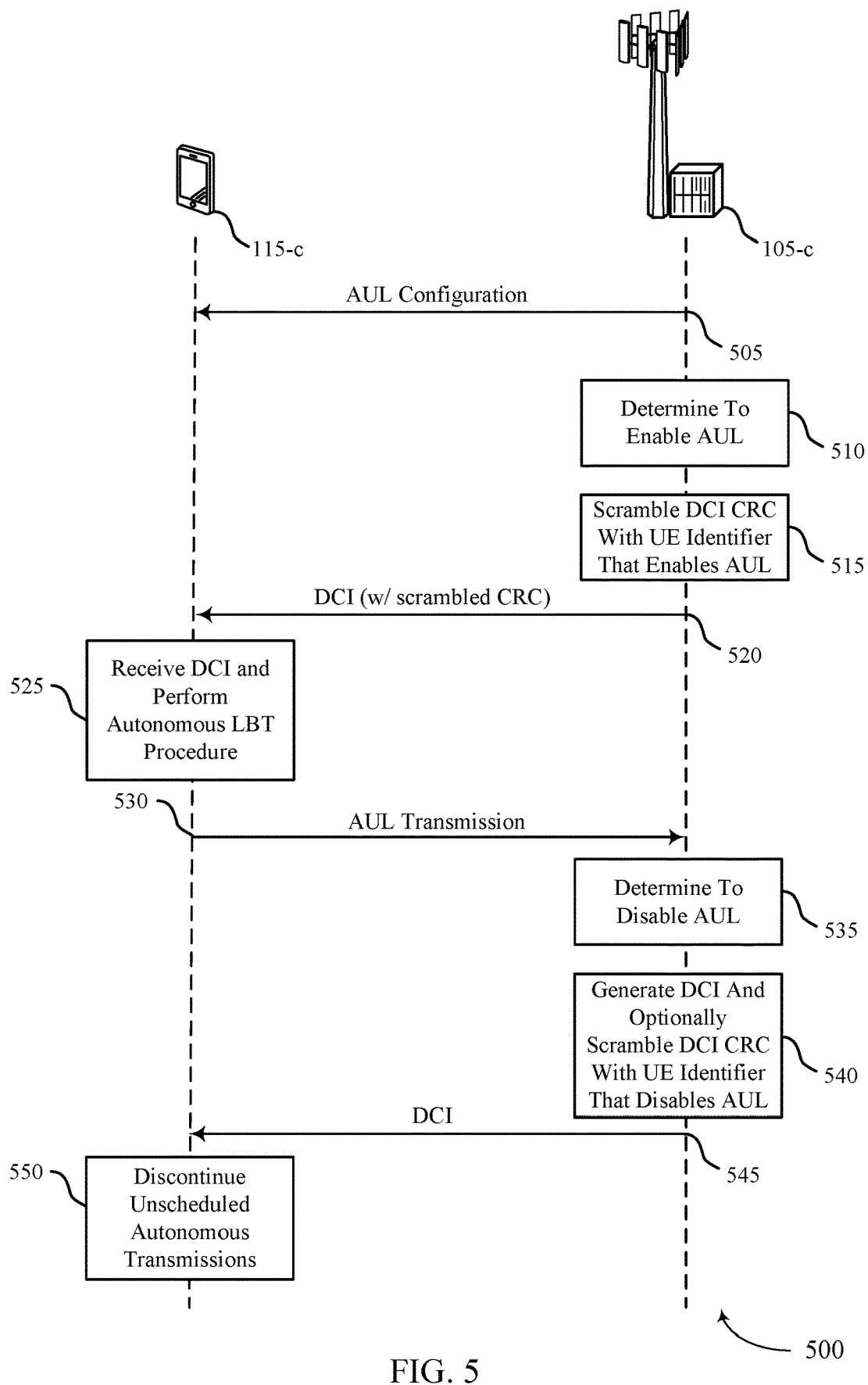
FIG. 5 illustrates an example of another process flow that supports autonomous uplink transmission techniques using shared radio frequency spectrum in accordance with aspects of the present disclosure.

FIG. 5 illustrates an example of another process flow 500 that supports autonomous uplink transmission techniques using shared radio frequency spectrum in accordance with various aspects of the present disclosure. Process flow 500 may include a UE 115-*c* and base station 105-*c*, which may be respective examples of a UE 115 and a base station 105 as described herein with reference to FIGS. 1-2. Process flow 500 may be an example of the use of different autonomous uplink transmission techniques, where UE 115-*c* may be configured to enable/disable AUL transmissions based on DCI.

The base station 105-*c* may determine an AUL configuration for the UE 115-*c*, and may transmit the AUL configuration 505 in a downlink transmission to the UE 115-*c*. In some cases, the AUL configuration 505 may be transmitted using RRC signaling.

At block 510, the base station 105-*c* may determine to enable the UE 115-*b* to for AUL transmissions. Such a determination may be made, for example, on an amount of information present at the UE 115-*c* for transmission (e.g., as reported in a buffer status report (BSR)), one or more other UEs that may be configured for AUL transmissions, channel conditions, network traffic conditions, one or more other parameters, or any combination thereof.

At block 515, the base station 105-*c* may scramble a DCI CRC with a UE identifier that enables AUL transmissions. In some examples, the UE identifier may be a AUL radio network temporary identifier (AUL-RNTI) that enables AUL transmissions from the UE 115-*c*. In some examples, a CRC for the DCI may be generated, and then scrambled with the AUL-RNTI. The base station 105-*c* may then transmit the DCI 520 with scrambled CRC.

At block 525, the UE 115-*c* may receive the DCI and perform an autonomous uplink LBT procedure. In some cases, the UE 115-*c* may perform a blind decode of the scrambled DCI according, and determine that AUL transmissions have been activated when the blind decode according to the AUL-RNTI scrambled CRC is successful in decoding the CRC of the DCI. In some cases, the DCI may provide semi-persistent scheduling (SPS) for the UE 115-*c*, which may be used for AUL transmissions. Based on a successful channel contention procedure, the UE 115-*c* may then transmit AUL transmission 530. The UE 115-*c* may continue channel contention procedures and AUL transmissions according to the SPS, in some examples.

At block 535, the base station 105-*c* may determine to disable AUL transmissions at the UE 115-*c*. Such a determination may be made in a similar manner as discussed above for determining to enable AUL transmissions, and be based on one or more of the same parameters.

At block 540, the base station 105-*c* may scramble a DCI CRC with a UE identifier that disables AUL transmissions. In some cases, the DCI CRC may simply be transmitted without scrambling, which may indicate to the UE 115-*c* that AUL transmission are disabled. In some cases, a different RNTI may optionally be used to scramble the CRC, which may indicate to the UE 115-*c* that AUL transmissions are disabled. The base station 105-*c* may transmit DCI 545 to the UE 115-*c*.

At block 550, the UE 115-*c* may receive the DCI 545, and discontinue unscheduled AUL transmissions. In some examples, the UE 115-*c* may make a determination to discontinue AUL transmissions based on whether the CRC of the DCI is scrambled or not, or based on an identifier used to scramble the CRC.

Figure 6:
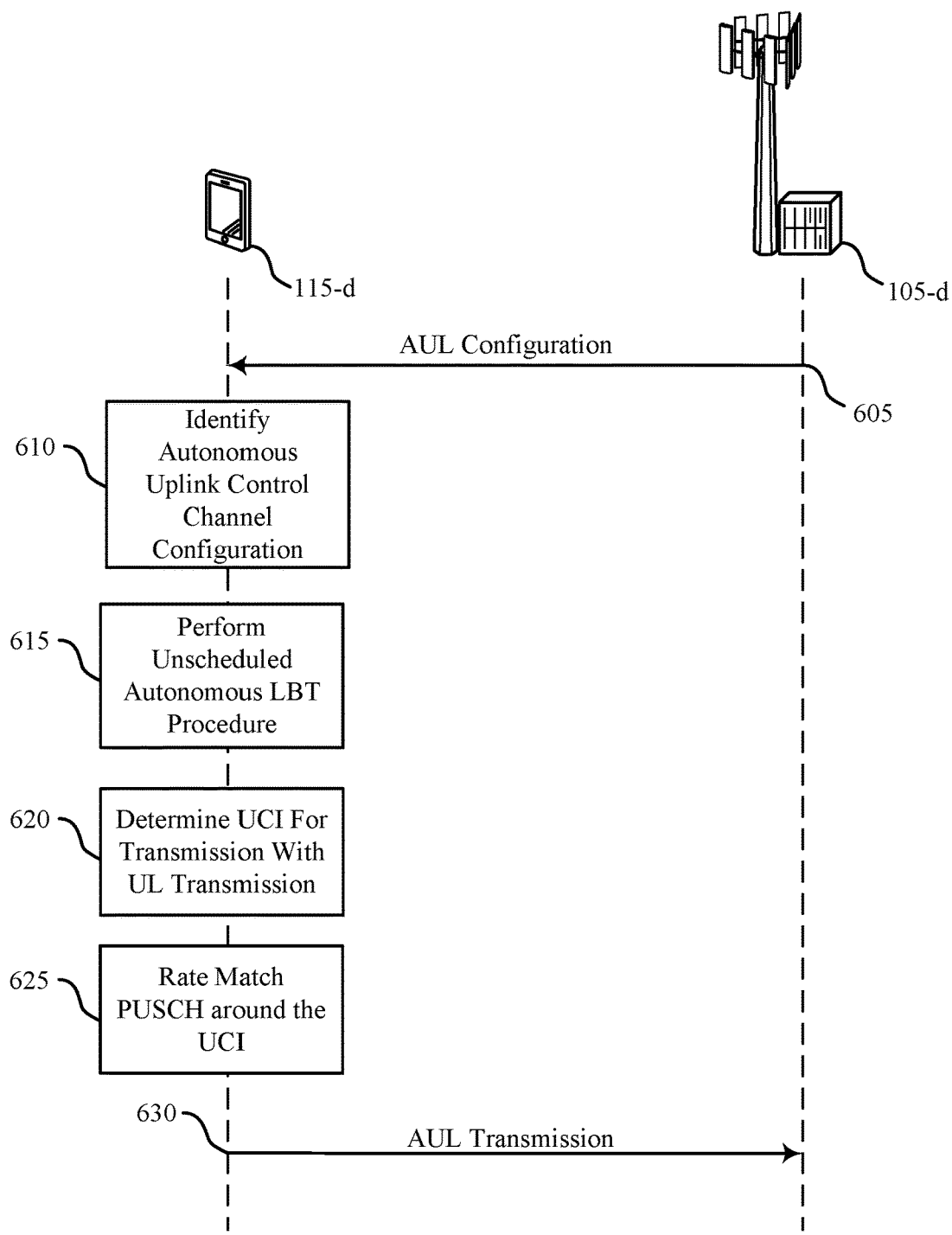
FIG. 6 illustrates an example of another process flow that supports autonomous uplink transmission techniques using shared radio frequency spectrum in accordance with aspects of the present disclosure.

FIG. 6 illustrates an example of another process flow 600 that supports autonomous uplink transmission techniques using shared radio frequency spectrum in accordance with various aspects of the present disclosure. Process flow 600 may include a UE 115-*d* and base station 105-*d*, which may be respective examples of a UE 115 and a base station 105 as described herein with reference to FIGS. 1-2.

The base station 105-*d* may determine an AUL configuration for the UE 115-d, and may transmit the AUL configuration 605 in a downlink transmission to the UE 115-*d*. In some cases, the AUL configuration 605 may be transmitted using RRC signaling.

At block 610, the UE 115-*d* may identify the AUL configuration and, based on the AUL configuration, may identify that data is to be transmitted to the base station 105-*d* using one or more AUL transmissions. In some cases, the AUL configuration may include a time period during which the UE 115-*d* may transmit AUL transmissions, and provide various parameters (e.g., MCS, uplink power control parameters, etc.).

At block 615, the UE 115-*d* may perform an LBT procedure in accordance with the AUL configuration. In some cases, the UE 115-*d* may perform a CCA in order to confirm that a channel of a shared radio frequency spectrum band is unoccupied by another transmitter, in a manner similarly as discussed above. In some cases, the LBT procedure may be successful and the UE 115-*d* may gain channel access.

At block 620, the UE 115-*d* may determine UCI for transmission with one or more AUL transmissions. The UCI may include, for example, one or more channel access parameters as discussed above, a HARQ ID, a burst length, a MCOT, a RV, a NDI, a AUL-RNTI, or any combination thereof At block 625, the UE 115-*d* may rate match the UCI and PUSCH information within uplink resources. In some cases, the UE 115-*d* may embed the A-UCI information by PUSCH rate matching in a similar manner as periodic CSI and ACK/NACK is carried on PUSCH in legacy LTE systems. In some cases, the base station 105-*d* may signal a number of resources used for rate matching. In some cases, the UCI payload may be a fixed size, and additionally or alternatively may be independent of the actual number of subframes that can be addressed by A-UCI (e.g. payload is budgeted for 4 subframe transmission). After rate-matching, the UE 115-*d* may transmit AUL transmission 630 to the base station 105-*d*.

Figure 7:
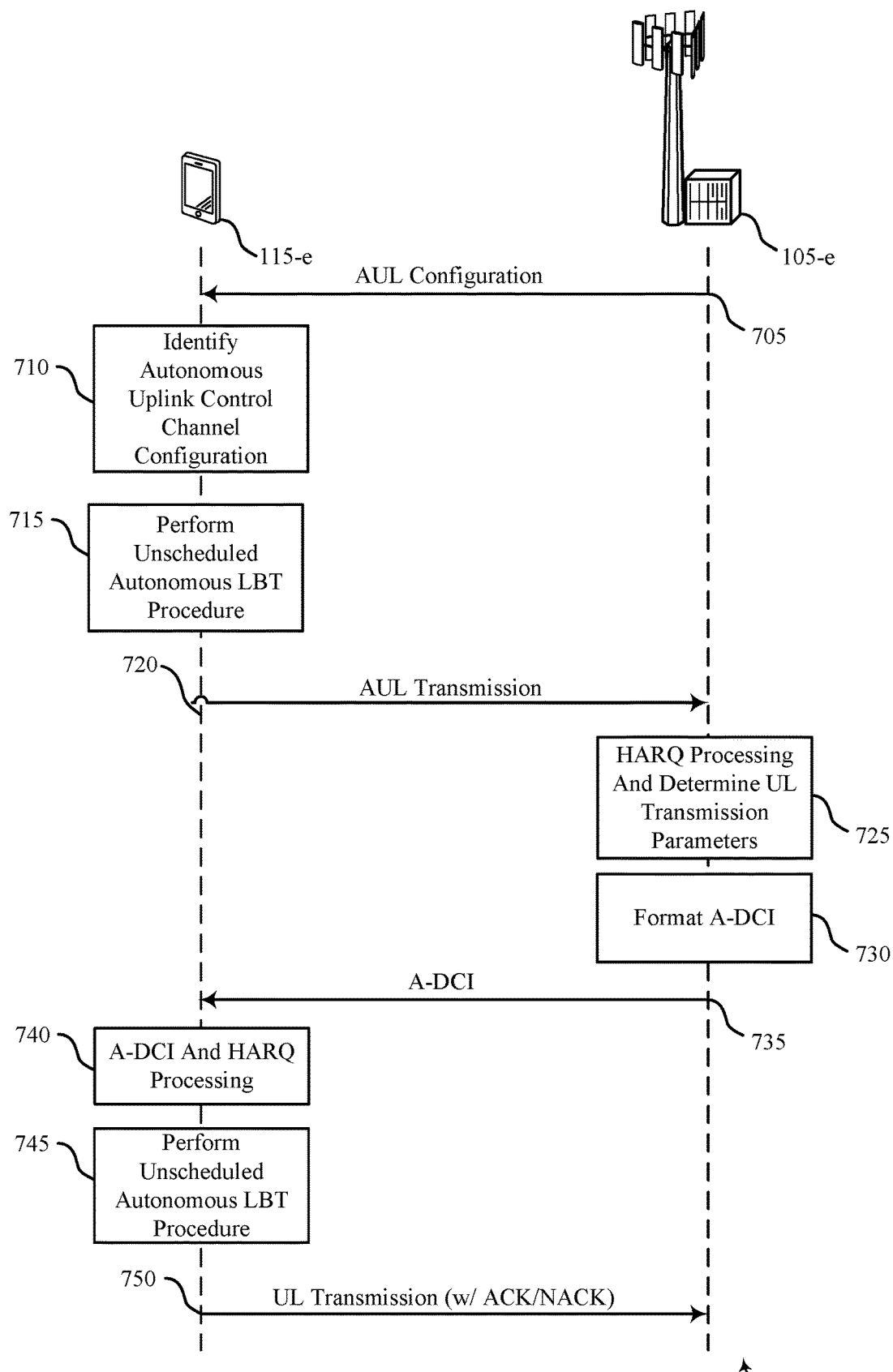
FIG. 7 illustrates an example of another process flow that supports autonomous uplink transmission techniques using shared radio frequency spectrum in accordance with aspects of the present disclosure.

FIG. 7 illustrates an example of another process flow 700 that supports autonomous uplink transmission techniques using shared radio frequency spectrum in accordance with various aspects of the present disclosure. Process flow 700 may include a UE 115-*e* and base station 105-*e*, which may be respective examples of a UE 115 and a base station 105 as described herein with reference to FIGS. 1-2.

The base station 105-*e* may determine an AUL configuration for the UE 115-*e*, and may transmit the AUL configuration 705 in a downlink transmission to the UE 115-*e*. In some cases, the AUL configuration 705 may be transmitted using RRC signaling.

At block 710, the UE 115-*e* may identify the AUL configuration and, based on the AUL configuration, may identify that data is to be transmitted to the base station 105-*e* using one or more AUL transmissions. In some cases, the AUL configuration may include a time period during which the UE 115-*e* may transmit AUL transmissions, and provide various parameters (e.g., MCS, uplink power control parameters, etc.).

At block 715, the UE 115-*e* may perform an LBT procedure in accordance with the AUL configuration. In some cases, the UE 115-*e* may perform a CCA in order to confirm that a channel of a shared radio frequency spectrum band is unoccupied by another transmitter, in a manner similarly as discussed above. In some cases, the LBT procedure may be successful and the UE 115-*e* may gain channel access and transmit AUL transmission 720.

At block 725, the base station 105-*e* may perform HARQ processing and determine one or more uplink transmission parameters. In some cases, base station 105-*e* may perform HARQ processing and generate a bitmap of ACK/NACK indicators for all the HARQ-processes, and in some cases ACK/NACK indicators may be bundled to save bits. In some cases, the one or more uplink transmission parameters may include uplink power control information. In some cases, a CQI and MCS update may be included in the uplink transmission parameters, and may be transmitted in a medium access control (MAC) control element (CE) in order to have the base station 105-*e* receive an acknowledgement from the UE 115-*e* to acknowledge reception. In some cases, the MAC-CE may be scrambled with the AUL-RNTI for the UE 115-*e*, and the UE 115-*e* may monitors for this grant for X ms after it has completed AUL transmission 720. Beyond Xms the UE 115-*e* may consider the AUL transmission 720 is lost and may initiate retransmission procedures.

At block 730, the base station 105-*e* may format the HARQ processing and UL transmission parameters into an A-DCI. The A-DCI 735 may be transmitted to the UE 115-*e* in a subsequent downlink transmission to the UE 115-*e*. In some examples, CQI or a MCS indicator may be provided in a MAC control element (CE) transmitted over a shared channel transmission. In some examples, the one or more uplink transmission parameters (e.g., the uplink power control information) may be formatted into an A-DCI. For example, the CQI or the MCS indicator may be included in the one or more uplink transmission parameters, and may be transmitted in the A-DCI 735. In some examples, the CQI indicator may also include a precoding matrix indicator.

At block 740, the UE 115-*e* may perform A-DCI and HARQ processing. Based on the processing, the UE 115-*e* may determine whether one or more AUL transmissions are to be retransmitted, and may determine one or more parameters for subsequent uplink transmissions, such as power control parameters, MCS, etc. In some cases, the UE 115-*e* may receive the MAC-CE with the CQI and MCS, and may generate an ACK/NACK for the MAC-CE as part of HARQ processing, thus allowing the base station 105-*e* to confirm that the CQI and MCS were successfully received.

At block 745, the UE 115-*e* may perform another LBT procedure in accordance with the AUL configuration. Upon successful LBT and gaining channel access, the UE 115-*e* may transmit a subsequent AUL transmission 750. The AUL transmission 750 may be transmitted according to one or more transmission parameters included in A-DCI 735, and may include an ACK/NACK indication of whether the MAC-CE was successfully received.

Figure 8:
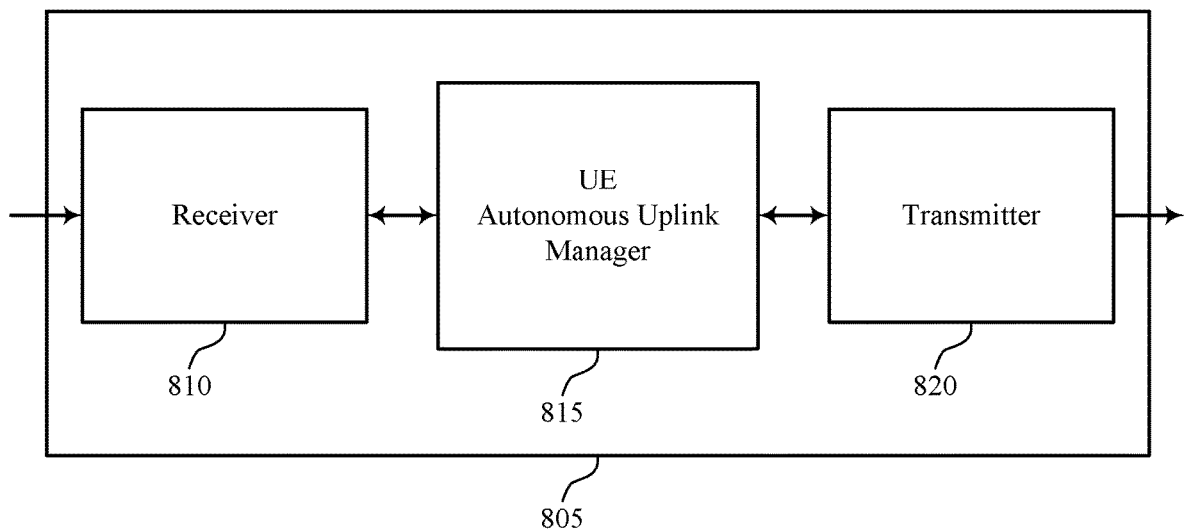
FIGS. 8 through 10 show block diagrams of a device that supports autonomous uplink transmission techniques using shared radio frequency spectrum in accordance with aspects of the present disclosure.

FIG. 8 shows a block diagram 800 of a wireless device 805 that supports autonomous uplink transmission techniques using shared radio frequency spectrum in accordance with various aspects of the present disclosure. Wireless device 805 may be an example of aspects of a user equipment (UE) 115 as described with reference to FIG. 1. Wireless device 805 may include receiver 810, UE autonomous uplink manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to autonomous uplink transmission techniques using shared radio frequency spectrum, etc.). Information may be passed on to other components of the device. The receiver 810 may be an example of aspects of the transceiver 1135 described with reference to FIG. 11.

UE autonomous uplink manager 815 may be an example of aspects of the UE autonomous uplink manager 1115 described with reference to FIG. 11. UE autonomous uplink manager 815 and/or at least some of its various sub-components may be implemented in hardware, software executed by a processor, firmware, or any combination thereof. If implemented in software executed by a processor, the functions of the UE autonomous uplink manager 815 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The UE autonomous uplink manager 815 and/or at least some of its various sub-components may be physically located at various positions, including being distributed such that portions of functions are implemented at different physical locations by one or more physical devices. In some examples, UE autonomous uplink manager 815 and/or at least some of its various sub-components may be a separate and distinct component in accordance with various aspects of the present disclosure. In other examples, UE autonomous uplink manager 815 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

In some examples, UE autonomous uplink manager 815 may contend for access to a channel of a shared radio frequency spectrum band in accordance with an autonomous uplink configuration which indicates a transmission window available for autonomous uplink transmissions, determine one or more channel access parameters based on one or more of a duration of an uplink transmission to be transmitted over the channel of the shared radio frequency spectrum band or a TA for the uplink transmission, and transmit the uplink transmission over the channel of the shared radio frequency spectrum band in accordance with the autonomous uplink configuration, where the uplink transmission indicates one or more of the channel access parameters.

In some cases, UE autonomous uplink manager 815 may receive RRC signaling including an autonomous uplink configuration for unscheduled autonomous uplink transmissions in a shared radio frequency spectrum band, receive DCI that activates autonomous uplink transmissions, contend for access to a channel of the shared radio frequency spectrum band in accordance with the autonomous uplink configuration, and transmit one or more autonomous uplink transmissions over the channel of the shared radio frequency spectrum band in accordance with the autonomous uplink configuration.

In some cases, UE autonomous uplink manager 815 may identify an autonomous uplink configuration for unscheduled uplink transmissions in a shared radio frequency spectrum band, contend for access to a channel of the shared radio frequency spectrum band in accordance with the autonomous uplink configuration, determine uplink control information and uplink shared channel information for an uplink transmission to be transmitted over the channel of the shared radio frequency spectrum band, rate matching the uplink shared channel information around the uplink control information in the uplink transmission, and transmit the uplink transmission over the channel of the shared radio frequency spectrum band in accordance with the autonomous uplink configuration.

In some cases, UE autonomous uplink manager 815 may identify an autonomous uplink configuration for unscheduled uplink transmissions in a shared radio frequency spectrum band, receive A-DCI associated with one or more autonomous uplink transmissions, and transmit an autonomous uplink transmission over the shared radio frequency spectrum band in accordance with the autonomous uplink configuration and the A-DCI.

Transmitter 820 may transmit signals generated by other components of the device. In some examples, the transmitter 820 may be collocated with a receiver 810 in a transceiver module. For example, the transmitter 820 may be an example of aspects of the transceiver 1135 described with reference to FIG. 11. The transmitter 820 may include a single antenna, or it may include a set of antennas.

Figure 9:
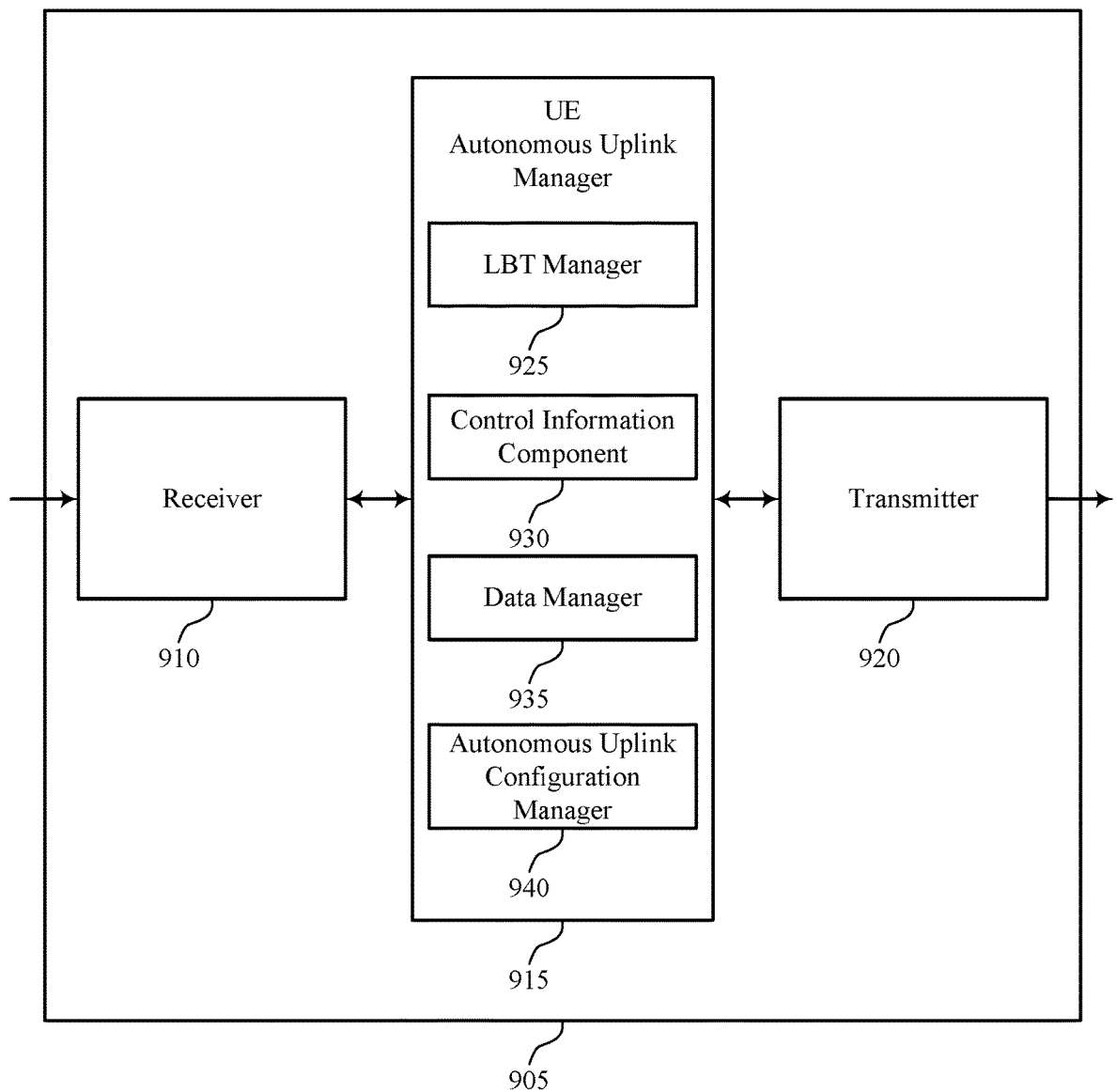

FIG. 9 shows a block diagram 900 of a wireless device 905 that supports autonomous uplink transmission techniques using shared radio frequency spectrum in accordance with various aspects of the present disclosure. Wireless device 905 may be an example of aspects of a wireless device 805 or a UE 115 as described with reference to FIGS. 1 and 8. Wireless device 905 may include receiver 910, UE autonomous uplink manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to autonomous uplink transmission techniques using shared radio frequency spectrum, etc.). Information may be passed on to other components of the device. The receiver 910 may be an example of aspects of the transceiver 1135 described with reference to FIG. 11.

UE autonomous uplink manager 915 may be an example of aspects of the UE autonomous uplink manager 1115 described with reference to FIG. 11. UE autonomous uplink manager 915 may also include listen-before-talk (LBT) manager 925, control information component 930, data manager 935, and autonomous uplink configuration manager 940.

LBT manager 925 may contend for access to a channel of a shared radio frequency spectrum band in accordance with an autonomous uplink configuration. In some cases, the UAL configuration may indicate a transmission window available for autonomous uplink transmissions and LBT manager 925 may contend for access to a channel of the shared radio frequency spectrum band in accordance with the autonomous uplink configuration.

Control information component 930 may determine one or more channel access parameters. In some cases, the channel access parameters may be based on one or more of a duration of an uplink transmission to be transmitted over the channel of the shared radio frequency spectrum band or a TA for the uplink transmission. In some cases, the control information component 930 may receive DCI that activates autonomous uplink transmissions, and receive subsequent DCI that deactivates autonomous uplink transmissions. In some cases, the control information component 930 may determine uplink control information and uplink shared channel information for an uplink transmission to be transmitted over the channel of the shared radio frequency spectrum band.

In some cases, the control information component 930 may receive A-DCI associated with one or more autonomous uplink transmissions. In some cases, the control information may include a CQI or a MCS indicator that is transmitted in a MAC-CE over a shared channel transmission, and an acknowledgment that the CQI or MCS are received may be provided. In some cases, the A-DCI includes a bitmap of feedback information associated with one or more feedback processes associated with one or more autonomous uplink transmission. In some cases, the A-DCI and/or MAC-CE includes uplink power control information for one or more autonomous uplink transmission.

In some cases, the difference between a MCOT and the duration of the uplink transmission is indicated in the channel access parameters as a number of subframes available for use by one or more other transmitters. In some cases, the DCI includes a CRC field scrambled with an identifier, and a value of the identifier indicates that the DCI is associated with autonomous uplink transmissions. In some cases, the one or more channel access parameters may include a MCOT for the uplink transmission, and a time difference between the MCOT and the duration of the uplink transmission. In some cases, a payload size of uplink control information may be a fixed size configured in the autonomous uplink configuration. In some cases, the payload size is independent of a number of subframes of the uplink transmission. In some cases, the resources used for the uplink control information and rate matching of the shared channel information is configured in the autonomous uplink configuration.

Data manager 935 may manage uplink transmissions. In some cases, data manager 935 may modify a waveform of the uplink transmission based on the TA, and transmit the uplink transmission over a channel of the shared radio frequency spectrum band in accordance with the autonomous uplink configuration, where the uplink transmission indicates one or more of the channel access parameters. In some cases, data manager 935 may determine that additional data is to be transmitted following a transmission window for AUL transmissions, and transmit one or more subsequent uplink transmissions after the uplink transmission outside of the transmission window when a MCOT is determined as part of the contending for access to the channel of the shared radio frequency spectrum band.

In some cases, data manager 935 may determine that AUL transmissions are activated, transmit one or more autonomous uplink transmissions over the channel of the shared radio frequency spectrum band in accordance with the autonomous uplink configuration, and discontinue contending for access to the channel of the shared radio frequency spectrum band responsive to the receiving a DCI that deactivates autonomous uplink transmissions. In some cases, data manager 935 may rate match uplink shared channel information around the uplink control information in the uplink transmission.

Autonomous uplink configuration manager 940 may receive RRC signaling including an autonomous uplink configuration for unscheduled autonomous uplink transmissions in a shared radio frequency spectrum band and identify an autonomous uplink configuration for unscheduled uplink transmissions in a shared radio frequency spectrum band.

Transmitter 920 may transmit signals generated by other components of the device. In some examples, the transmitter 920 may be collocated with a receiver 910 in a transceiver module. For example, the transmitter 920 may be an example of aspects of the transceiver 1135 described with reference to FIG. 11. The transmitter 920 may include a single antenna, or it may include a set of antennas.

Figure 10:
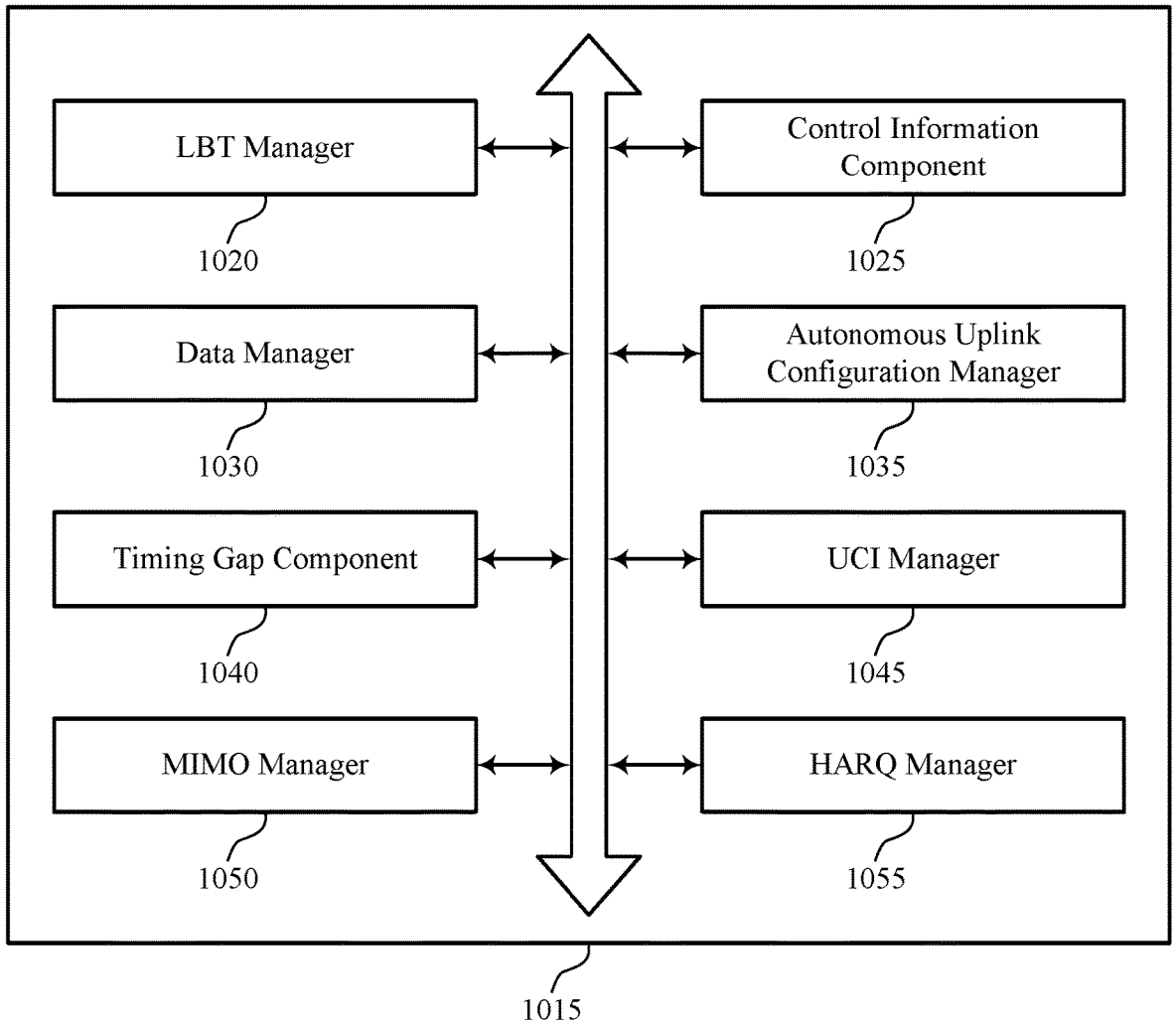

FIG. 10 shows a block diagram 1000 of a UE autonomous uplink manager 1015 that supports autonomous uplink transmission techniques using shared radio frequency spectrum in accordance with various aspects of the present disclosure. The UE autonomous uplink manager 1015 may be an example of aspects of a UE autonomous uplink manager 815, a UE autonomous uplink manager 915, or a UE autonomous uplink manager 1115 described with reference to FIGS. 8, 9, and 11. The UE autonomous uplink manager 1015 may include LBT manager 1020, control information component 1025, data manager 1030, autonomous uplink configuration manager 1035, timing gap component 1040, UCI manager 1045, MIMO manager 1050, and hybrid automatic repeat request (HARD) manager 1055. Each of these modules may communicate, directly or indirectly, with one another (e.g., via one or more buses).

LBT manager 1020 may contend for access to a channel of a shared radio frequency spectrum band in accordance with an autonomous uplink configuration which indicates a transmission window available for autonomous uplink.

Control information component 1025 may determine one or more channel access parameters. In some cases, the one or more channel access parameters may be based on one or more of a duration of an uplink transmission to be transmitted over the channel of the shared radio frequency spectrum band or a TA for the uplink transmission. In some cases, the control information component 1025 may receive DCI that activates autonomous uplink transmissions, and receive subsequent DCI that deactivates autonomous uplink transmissions. In some cases, the control information component 1025 may determine uplink control information and uplink shared channel information for an uplink transmission to be transmitted over the channel of the shared radio frequency spectrum band.

In some cases, the control information component 1025 may receive A-DCI associated with one or more autonomous uplink transmissions. In some cases, a CQI or a MCS indicator may be provided in a MAC-CE transmitted over a shared channel, and an acknowledgment that the CQI or MCS are received may be provided. In some cases, the A-DCI includes a bitmap of feedback information associated with one or more feedback processes associated with one or more autonomous uplink transmission. In some cases, the A-DCI and/or MAC-CE includes uplink power control information for one or more autonomous uplink transmission.

In some cases, the difference between a MCOT and the duration of the uplink transmission is indicated in the channel access parameters as a number of subframes available for use by one or more other transmitters. In some cases, the DCI includes a CRC field scrambled with an identifier, and a value of the identifier indicates that the DCI is associated with autonomous uplink transmissions. In some cases, the one or more channel access parameters may include a MCOT for the uplink transmission, and a time difference between the MCOT and the duration of the uplink transmission. In some cases, a payload size of uplink control information may be a fixed size configured in the autonomous uplink configuration. In some cases, the payload size is independent of a number of subframes of the uplink transmission. In some cases, the resources used for the uplink control information and rate matching of the shared channel information is configured in the autonomous uplink configuration.

Data manager 1030 may manage uplink transmissions. In some cases, data manager 1030 may modify a waveform of the uplink transmission based on the TA, and transmit the uplink transmission over a channel of the shared radio frequency spectrum band in accordance with the autonomous uplink configuration, where the uplink transmission indicates one or more of the channel access parameters. In some cases, data manager 1030 may determine that additional data is to be transmitted following a transmission window for AUL transmissions, and transmit one or more subsequent uplink transmissions after the uplink transmission outside of the transmission window when a MCOT is determined as part of the contending for access to the channel of the shared radio frequency spectrum band.

In some cases, data manager 1030 may determine that AUL transmissions are activated, transmit one or more autonomous uplink transmissions over the channel of the shared radio frequency spectrum band in accordance with the autonomous uplink configuration, and discontinue contending for access to the channel of the shared radio frequency spectrum band responsive to the receiving a DCI that deactivates autonomous uplink transmissions. In some cases, data manager 1030 may rate match uplink shared channel information around the uplink control information in the uplink transmission.

Autonomous uplink configuration manager 1035 may receive RRC signaling including an autonomous uplink configuration for unscheduled autonomous uplink transmissions in a shared radio frequency spectrum band and identify an autonomous uplink configuration for unscheduled uplink transmissions in a shared radio frequency spectrum band.

Timing gap component 1040 may identify a time for starting a subsequent downlink transmission following the uplink transmission, format the uplink transmission to occupy the channel of the shared radio frequency spectrum band until the time for starting the subsequent downlink transmission. In some cases, a transmitter of the subsequent downlink transmission performs a CCA to occupy a maximum time gap between the uplink transmission and the subsequent downlink transmission. In some cases, timing gap component 1040 may transmit a time difference between a MCOT and a duration of the uplink transmission to a base station, where the base station may transmit one or more transmissions during the time difference. In some cases, one or more other UEs may be precluded from transmitting during the time difference.

In some cases, a AUL waveform may be modified by formatting data to be transmitted into the uplink transmission, identifying a timing for starting a subsequent downlink transmission following the uplink transmission and a maximum time gap between the uplink transmission and the subsequent downlink transmission, determining a difference between the maximum time gap and the TA, and puncturing a last symbol of the uplink transmission for a duration of the difference between the maximum time gap and the TA. In some cases, the waveform may be modified by formatting data to be transmitted into the uplink transmission, identifying a timing for starting a subsequent downlink transmission following the uplink transmission and a maximum time gap between the uplink transmission and the subsequent downlink transmission, determining a time difference between an end of a last symbol of the uplink transmission and the maximum time gap, and cyclically extending samples of the last symbol of the uplink transmission to extend for a duration of the difference between the maximum time gap and the TA. In some cases, the determining one or more channel access parameters further includes determining that the TA exceeds a maximum time gap between the uplink transmission and a subsequent downlink transmission, and where the TA is indicated in the uplink transmission to allow another transmitter to transmit a reservation signal for at least a portion of the TA.

UCI manager 1045 may identify UCI associated with the uplink transmission and transmit the UCI in a symbol of the uplink transmission before a last symbol of the uplink transmission. In some cases, a first subframe of a first subsequent uplink transmission of the one or more subsequent uplink transmissions includes control channel information that provides information on the one or more subsequent uplink transmissions. In some cases, UCI may include a burst length of the uplink transmission, a MCOT, a RV indication, a NDI, or an AUL-RNTI.

MIMO manager 1050 may enable autonomous uplink transmissions on one or more transmit antennas according to a MIMO configuration. HARQ manager 1055 may provide one or more of a HARQ identification and provide HARQ processing. In some cases, the HARQ feedback information includes one or more ACK/NACK indications for one or more HARQ processes. In some cases, the bits from two or more feedback processes are bundled.

Figure 11:
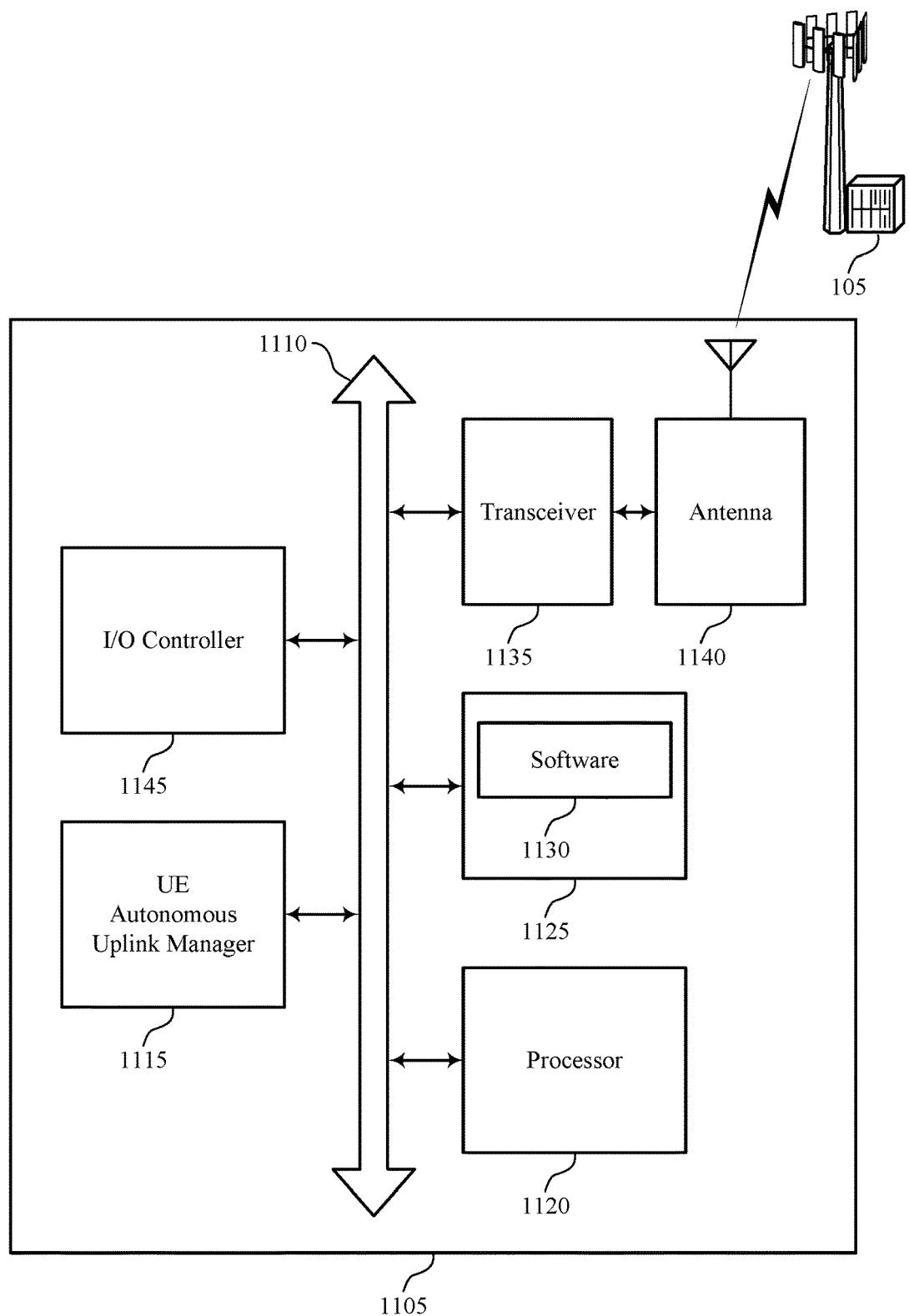
FIG. 11 illustrates a block diagram of a system including a user equipment (UE) that supports autonomous uplink transmission techniques using shared radio frequency spectrum in accordance with aspects of the present disclosure.

FIG. 11 shows a diagram of a system 1100 including a device 1105 that supports autonomous uplink transmission techniques using shared radio frequency spectrum in accordance with various aspects of the present disclosure. Device 1105 may be an example of or include the components of wireless device 805, wireless device 905, or a UE 115 as described above, e.g., with reference to FIGS. 1, 8 and 9. Device 1105 may include components for bi-directional voice and data communications including components for transmitting and receiving communications, including UE autonomous uplink manager 1115, processor 1120, memory 1125, software 1130, transceiver 1135, antenna 1140, and I/O controller 1145. These components may be in electronic communication via one or more busses (e.g., bus 1110). Device 1105 may communicate wirelessly with one or more base stations 105.

Processor 1120 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1120 may be configured to operate a memory array using a memory controller. In other cases, a memory controller may be integrated into processor 1120. Processor 1120 may be configured to execute computer-readable instructions stored in a memory to perform various functions (e.g., functions or tasks supporting autonomous uplink transmission techniques using shared radio frequency spectrum).

Memory 1125 may include random access memory (RAM) and read only memory (ROM). The memory 1125 may store computer-readable, computer-executable software 1130 including instructions that, when executed, cause the processor to perform various functions described herein. In some cases, the memory 1125 may contain, among other things, a basic input/output system (BIOS) which may control basic hardware and/or software operation such as the interaction with peripheral components or devices.

Software 1130 may include code to implement aspects of the present disclosure, including code to support autonomous uplink transmission techniques using shared radio frequency spectrum. Software 1130 may be stored in a non-transitory computer-readable medium such as system memory or other memory. In some cases, the software 1130 may not be directly executable by the processor but may cause a computer (e.g., when compiled and executed) to perform functions described herein.

Transceiver 1135 may communicate bi-directionally, via one or more antennas, wired, or wireless links as described above. For example, the transceiver 1135 may represent a wireless transceiver and may communicate bi-directionally with another wireless transceiver. The transceiver 1135 may also include a modem to modulate the packets and provide the modulated packets to the antennas for transmission, and to demodulate packets received from the antennas.

In some cases, the wireless device may include a single antenna 1140. However, in some cases the device may have more than one antenna 1140, which may be capable of concurrently transmitting or receiving multiple wireless transmissions.

I/O controller 1145 may manage input and output signals for device 1105. I/O controller 1145 may also manage peripherals not integrated into device 1105. In some cases, I/O controller 1145 may represent a physical connection or port to an external peripheral. In some cases, I/O controller 1145 may utilize an operating system such as iOS®, ANDROID®, MS-DOS®, MS-WINDOWS®, OS/2®, UNIX®, LINUX®, or another known operating system. In other cases, I/O controller 1145 may represent or interact with a modem, a keyboard, a mouse, a touchscreen, or a similar device. In some cases, I/O controller 1145 may be implemented as part of a processor. In some cases, a user may interact with device 1105 via I/O controller 1145 or via hardware components controlled by I/O controller 1145.

Figure 12:
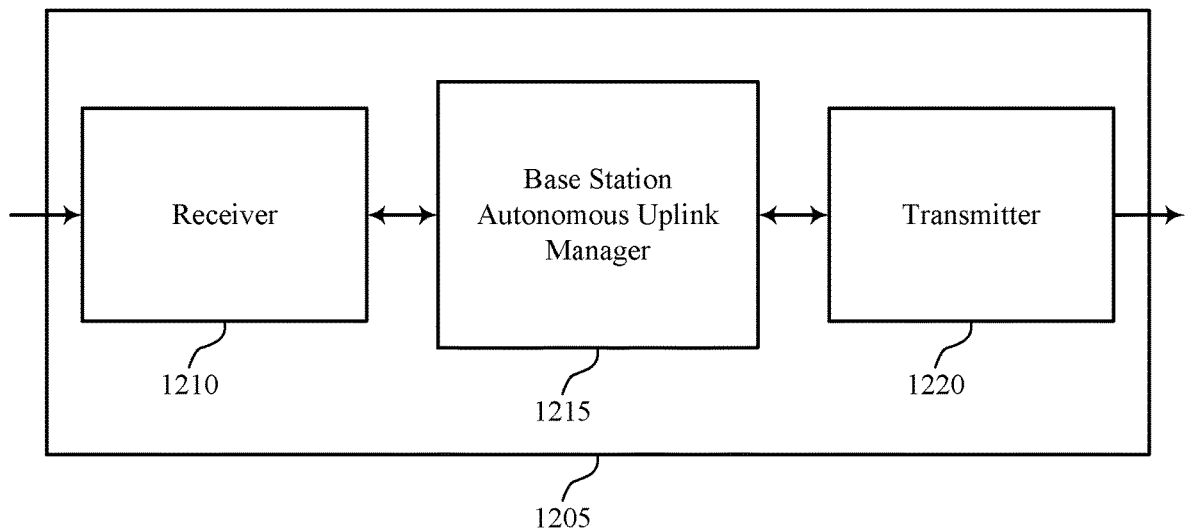
FIGS. 12 through 14 show block diagrams of a device that supports autonomous uplink transmission techniques using shared radio frequency spectrum in accordance with aspects of the present disclosure.

FIG. 12 shows a block diagram 1200 of a wireless device 1205 that supports autonomous uplink transmission techniques using shared radio frequency spectrum in accordance with various aspects of the present disclosure. Wireless device 1205 may be an example of aspects of a base station 105 as described with reference to FIG. 1. Wireless device 1205 may include receiver 1210, base station autonomous uplink manager 1215, and transmitter 1220. Wireless device 1205 may also include a processor. Each of these components may be in communication with one another (e.g., via one or more buses).

Receiver 1210 may receive information such as packets, user data, or control information associated with various information channels (e.g., control channels, data channels, and information related to autonomous uplink transmission techniques using shared radio frequency spectrum, etc.). Information may be passed on to other components of the device. The receiver 1210 may be an example of aspects of the transceiver 1535 described with reference to FIG. 15.

Receiver 1210 may receive one or more autonomous uplink transmissions over the channel of the shared radio frequency spectrum band in accordance with the autonomous uplink configuration.

Base station autonomous uplink manager 1215 may be an example of aspects of the base station autonomous uplink manager 1515 described with reference to FIG. 15.

Base station autonomous uplink manager 1215 and/or at least some of its various sub-components may be implemented in hardware, software executed by a processor, firmware, or any combination thereof If implemented in software executed by a processor, the functions of the base station autonomous uplink manager 1215 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The base station autonomous uplink manager 1215 and/or at least some of its various sub-components may be physically located at various positions, including being distributed such that portions of functions are implemented at different physical locations by one or more physical devices. In some examples, base station autonomous uplink manager 1215 and/or at least some of its various sub-components may be a separate and distinct component in accordance with various aspects of the present disclosure. In other examples, base station autonomous uplink manager 1215 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station autonomous uplink manager 1215 may configure a UE for autonomous uplink transmissions in a shared radio frequency spectrum band, receive an autonomous uplink transmission from the UE over the shared radio frequency spectrum band, the autonomous uplink transmission including one or more channel access parameters, and transmit a downlink transmission over the shared radio frequency spectrum band in accordance with one or more of the channel access parameters. The base station autonomous uplink manager 1215 may also transmit RRC signaling to a UE that includes an autonomous uplink configuration for unscheduled autonomous uplink transmissions in a shared radio frequency spectrum band, determine that the autonomous uplink transmissions should be activated for the UE, transmit DCI that activates autonomous uplink transmissions responsive to determining that the autonomous uplink transmissions should be activated for the UE, determine that that the autonomous uplink transmissions should be deactivated for the UE, and transmit DCI that deactivates the autonomous uplink transmissions responsive to determining that the autonomous uplink transmissions should be deactivated for the UE.

Transmitter 1220 may transmit signals generated by other components of the device. In some examples, the transmitter 1220 may be collocated with a receiver 1210 in a transceiver module. For example, the transmitter 1220 may be an example of aspects of the transceiver 1535 described with reference to FIG. 15. The transmitter 1220 may include a single antenna, or it may include a set of antennas.

Figure 13:
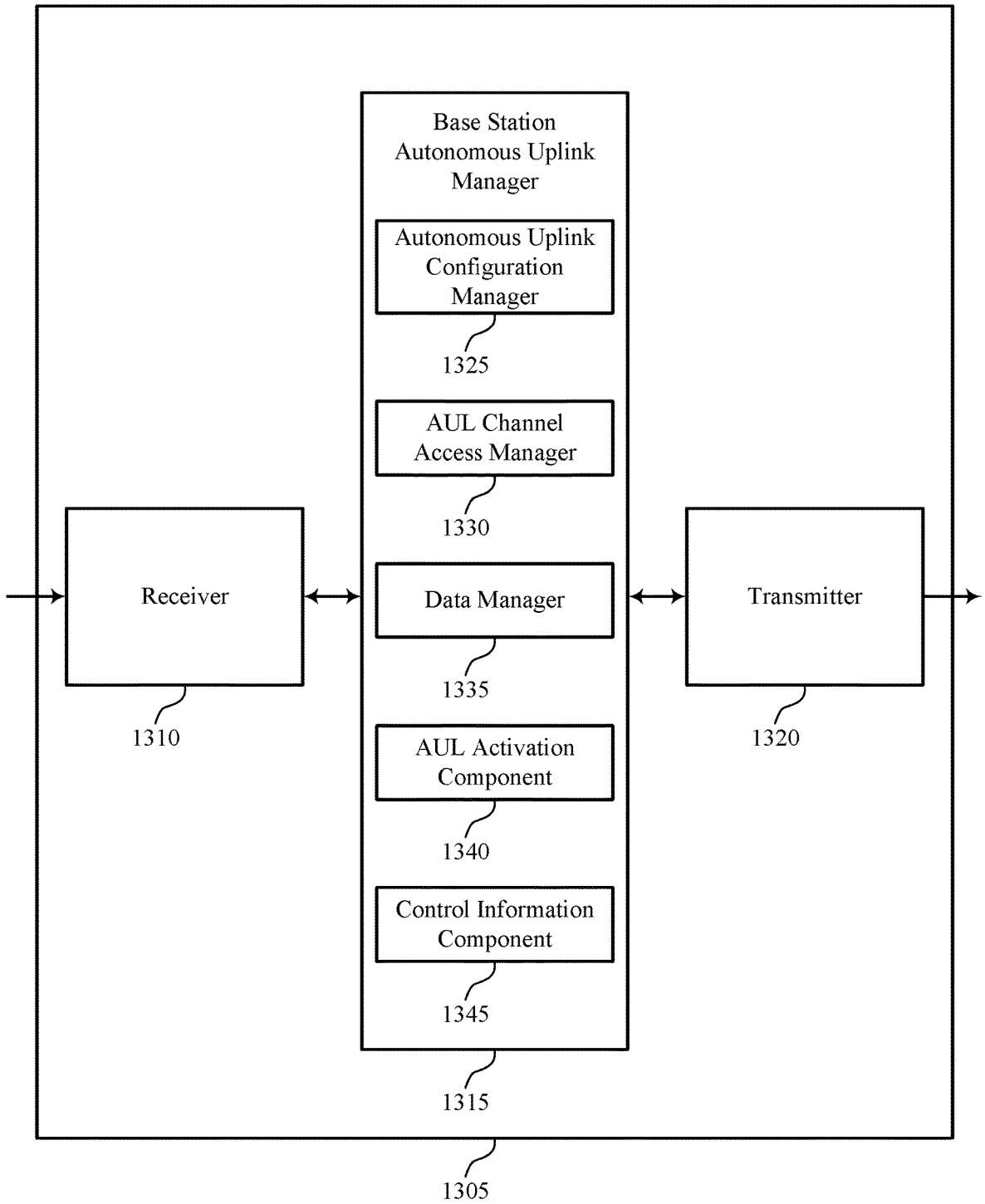

FIG. 13 shows a block diagram 1300 of a wireless device 1305 that supports autonomous uplink transmission techniques using shared radio frequency spectrum in accordance with various aspects of the present disclosure. Wireless device 1305 may be an example of aspects of a wireless device 1205 or a base station 105 as described with reference to FIGS. 1 and 12. Wireless device 1305 may include receiver 1310, base station autonomous uplink manager 1315, and transmitter 1320. Wireless device 1305 may also include a processor. Each of these components may be in communication with one another (e.g., via one or more buses).

Receiver 1310 may receive information such as packets, user data, or control information associated with various information channels (e.g., control channels, data channels, and information related to autonomous uplink transmission techniques using shared radio frequency spectrum, etc.). Information may be passed on to other components of the device. The receiver 1310 may be an example of aspects of the transceiver 1535 described with reference to FIG. 15.

Base station autonomous uplink manager 1315 may be an example of aspects of the base station autonomous uplink manager 1515 described with reference to FIG. 15. Base station autonomous uplink manager 1315 may also include autonomous uplink configuration manager 1325, AUL channel access manager 1330, data manager 1335, AUL activation component 1340, and control information component 1345.

Autonomous uplink configuration manager 1325 may configure a UE for autonomous uplink transmissions in a shared radio frequency spectrum band and transmit RRC signaling to a UE that includes an autonomous uplink configuration for unscheduled autonomous uplink transmissions in a shared radio frequency spectrum band.

AUL channel access manager 1330 may receive an autonomous uplink transmission from the UE over the shared radio frequency spectrum band, the autonomous uplink transmission including one or more channel access parameters. In some cases, the channel access parameters include a number of subframes available for downlink transmissions based on a time difference between uplink transmissions and a MCOT acquired by the UE. In some cases, the base station may transmit one or more transmissions during the time difference, and transmissions to one or more UEs other than the UE that acquired the MCOT are precluded during the time difference.

Data manager 1335 may transmit a downlink transmission over the shared radio frequency spectrum band in accordance with one or more of the channel access parameters.

AUL activation component 1340 may determine that the autonomous uplink transmissions should be activated for the UE and determine that that the autonomous uplink transmissions should be deactivated for the UE.

Control information component 1345 may transmit DCI that activates autonomous uplink transmissions responsive to determining that the autonomous uplink transmissions should be activated for the UE and transmit DCI that deactivates the autonomous uplink transmissions responsive to determining that the autonomous uplink transmissions should be deactivated for the UE. In some cases, the autonomous uplink transmission includes uplink control information including one or more of a HARQ identification, a burst length of the uplink transmission, a MCOT, a RV indication, a NDI, or an AUL-RNTI. In some cases, the downlink transmission includes A-DCI associated with one or more autonomous uplink transmissions. In some cases, the DCI includes a CRC field scrambled with an AUL-RNTI for the UE, and where a value of the AUL-RNTI indicates whether autonomous uplink transmissions are activated or deactivated.

Transmitter 1320 may transmit signals generated by other components of the device. In some examples, the transmitter 1320 may be collocated with a receiver 1310 in a transceiver module. For example, the transmitter 1320 may be an example of aspects of the transceiver 1535 described with reference to FIG. 15. The transmitter 1320 may include a single antenna, or it may include a set of antennas.

Figure 14:
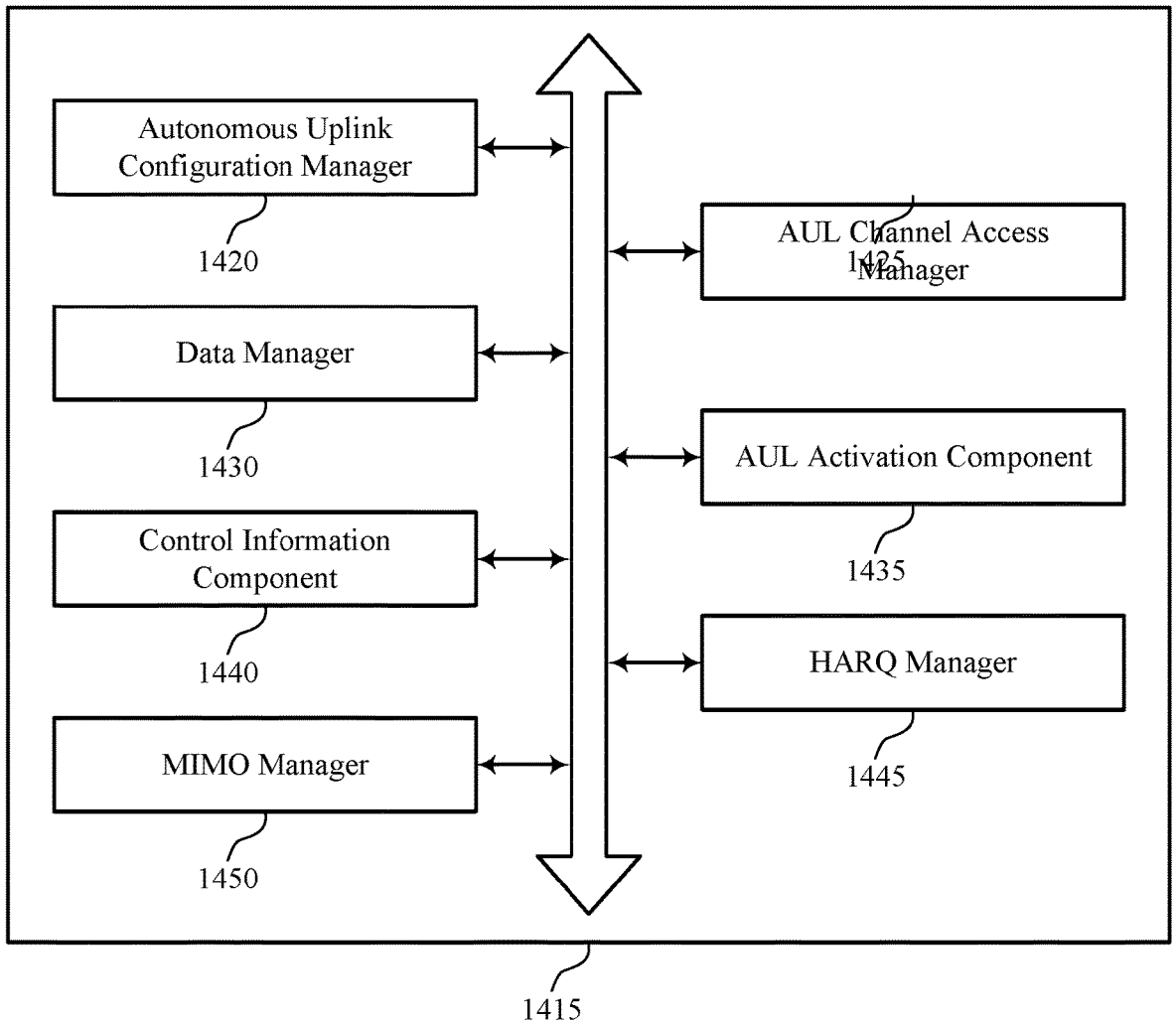

FIG. 14 shows a block diagram 1400 of a base station autonomous uplink manager 1415 that supports autonomous uplink transmission techniques using shared radio frequency spectrum in accordance with various aspects of the present disclosure. The base station autonomous uplink manager 1415 may be an example of aspects of a base station autonomous uplink manager 1515 described with reference to FIGS. 12, 13, and 15. The base station autonomous uplink manager 1415 may include autonomous uplink configuration manager 1420, AUL channel access manager 1425, data manager 1430, AUL activation component 1435, control information component 1440, HARQ manager 1445, and MIMO manager 1450. Each of these modules may communicate, directly or indirectly, with one another (e.g., via one or more buses).

Autonomous uplink configuration manager 1420 may configure a UE for autonomous uplink transmissions in a shared radio frequency spectrum band and transmit RRC signaling to a UE that includes an autonomous uplink configuration for unscheduled autonomous uplink transmissions in a shared radio frequency spectrum band.

AUL channel access manager 1425 may receive an autonomous uplink transmission from the UE over the shared radio frequency spectrum band, the autonomous uplink transmission including one or more channel access parameters. In some cases, the channel access parameters include a number of subframes available for downlink transmissions based on a time difference between uplink transmissions and a MCOT acquired by the UE. In some cases, the base station may transmit one or more transmissions during the time difference, and transmissions to one or more UEs other than the UE that acquired the MCOT are precluded during the time difference.

Data manager 1430 may transmit a downlink transmission over the shared radio frequency spectrum band in accordance with one or more of the channel access parameters.

AUL activation component 1435 may determine that the autonomous uplink transmissions should be activated for the UE and determine that that the autonomous uplink transmissions should be deactivated for the UE.

Control information component 1440 may transmit DCI that activates autonomous uplink transmissions responsive to determining that the autonomous uplink transmissions should be activated for the UE and transmit DCI that deactivates the autonomous uplink transmissions responsive to determining that the autonomous uplink transmissions should be deactivated for the UE. In some cases, the autonomous uplink transmission includes uplink control information including one or more of a HARQ identification, a burst length of the uplink transmission, a MCOT, a RV indication, a NDI, or an AUL-RNTI. In some cases, the downlink transmission includes A-DCI associated with one or more autonomous uplink transmissions. In some cases, the DCI includes a CRC field scrambled with an AUL-RNTI for the UE, and where a value of the AUL-RNTI indicates whether autonomous uplink transmissions are activated or deactivated.

HARQ manager 1445 may perform HARQ feedback processing. In some cases, the A-DCI includes one or more of a bitmap of feedback information associated with one or more feedback processes associated with one or more autonomous uplink transmission, one or more ACK/NACK indications, or uplink power control information. In some cases, the bits from two or more feedback processes are bundled.

MIMO manager 1450 may enable autonomous uplink transmissions on one or more transmit antennas according to a multiple input multiple output (MIMO) configuration.

Figure 15:
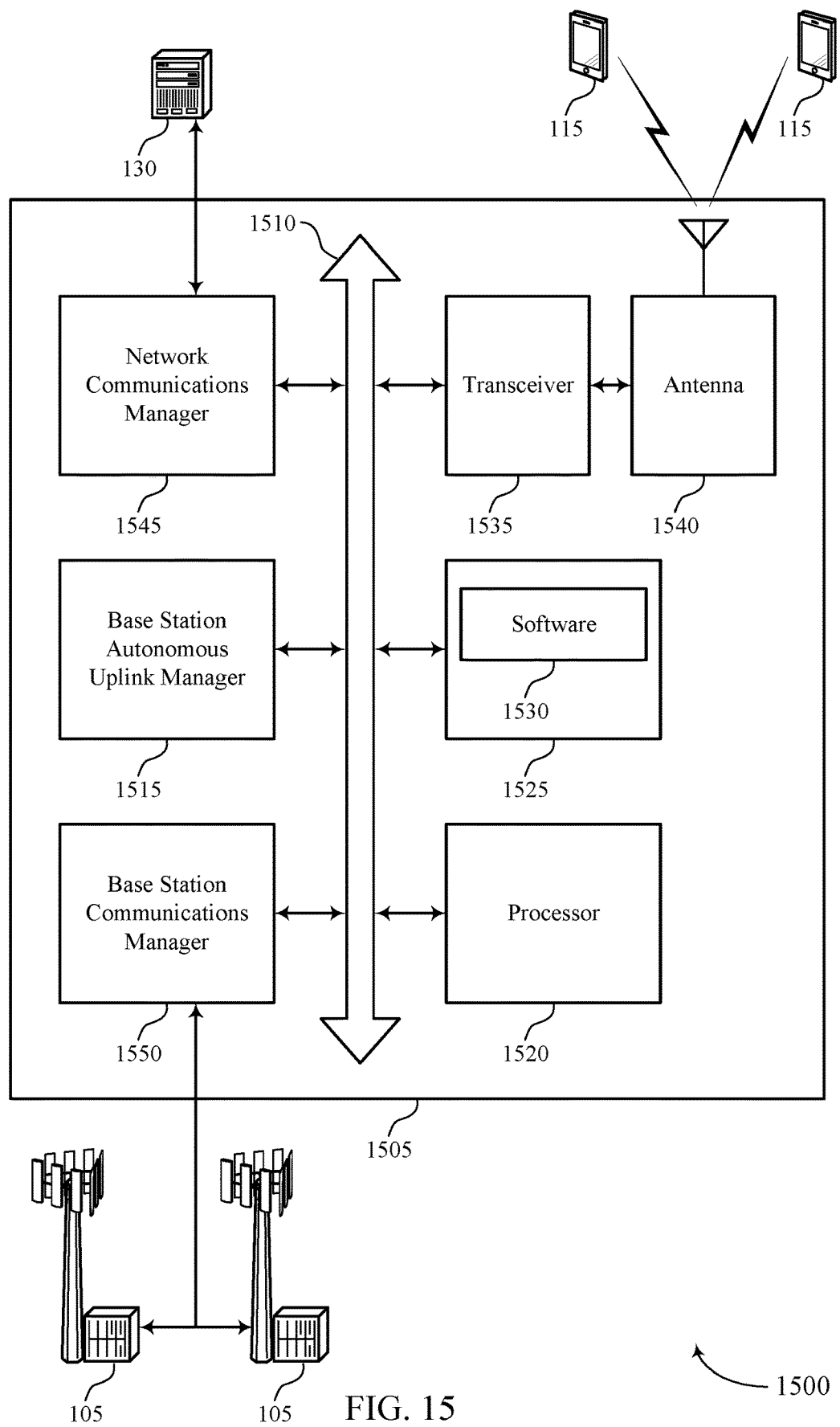
FIG. 15 illustrates a block diagram of a system including a base station that supports autonomous uplink transmission techniques using shared radio frequency spectrum in accordance with aspects of the present disclosure.

FIG. 15 shows a diagram of a system 1500 including a device 1505 that supports autonomous uplink transmission techniques using shared radio frequency spectrum in accordance with various aspects of the present disclosure. Device 1505 may be an example of or include the components of base station 105 as described above, e.g., with reference to FIG. 1. Device 1505 may include components for bi-directional voice and data communications including components for transmitting and receiving communications, including base station autonomous uplink manager 1515, processor 1520, memory 1525, software 1530, transceiver 1535, antenna 1540, network communications manager 1545, and base station communications manager 1550. These components may be in electronic communication via one or more busses (e.g., bus 1510). Device 1505 may communicate wirelessly with one or more UEs 115.

Processor 1520 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1520 may be configured to operate a memory array using a memory controller. In other cases, a memory controller may be integrated into processor 1520. Processor 1520 may be configured to execute computer-readable instructions stored in a memory to perform various functions (e.g., functions or tasks supporting autonomous uplink transmission techniques using shared radio frequency spectrum).

Memory 1525 may include RAM and ROM. The memory 1525 may store computer-readable, computer-executable software 1530 including instructions that, when executed, cause the processor to perform various functions described herein. In some cases, the memory 1525 may contain, among other things, a BIOS which may control basic hardware and/or software operation such as the interaction with peripheral components or devices.

Software 1530 may include code to implement aspects of the present disclosure, including code to support autonomous uplink transmission techniques using shared radio frequency spectrum. Software 1530 may be stored in a non-transitory computer-readable medium such as system memory or other memory. In some cases, the software 1530 may not be directly executable by the processor but may cause a computer (e.g., when compiled and executed) to perform functions described herein.

Transceiver 1535 may communicate bi-directionally, via one or more antennas, wired, or wireless links as described above. For example, the transceiver 1535 may represent a wireless transceiver and may communicate bi-directionally with another wireless transceiver. The transceiver 1535 may also include a modem to modulate the packets and provide the modulated packets to the antennas for transmission, and to demodulate packets received from the antennas.

In some cases, the wireless device may include a single antenna 1540. However, in some cases the device may have more than one antenna 1540, which may be capable of concurrently transmitting or receiving multiple wireless transmissions.

Network communications manager 1545 may manage communications with the core network (e.g., via one or more wired backhaul links). For example, the network communications manager 1545 may manage the transfer of data communications for client devices, such as one or more UEs 115.

Base station communications manager 1550 may manage communications with other base station 105, and may include a controller or scheduler for controlling communications with UEs 115 in cooperation with other base stations 105. For example, the base station communications manager 1550 may coordinate scheduling for transmissions to UEs 115 for various interference mitigation techniques such as beamforming or joint transmission. In some examples, base station communications manager 1550 may provide an X2 interface within an Long Term Evolution (LTE)/LTE-A wireless communication network technology to provide communication between base stations 105.

Figure 16:
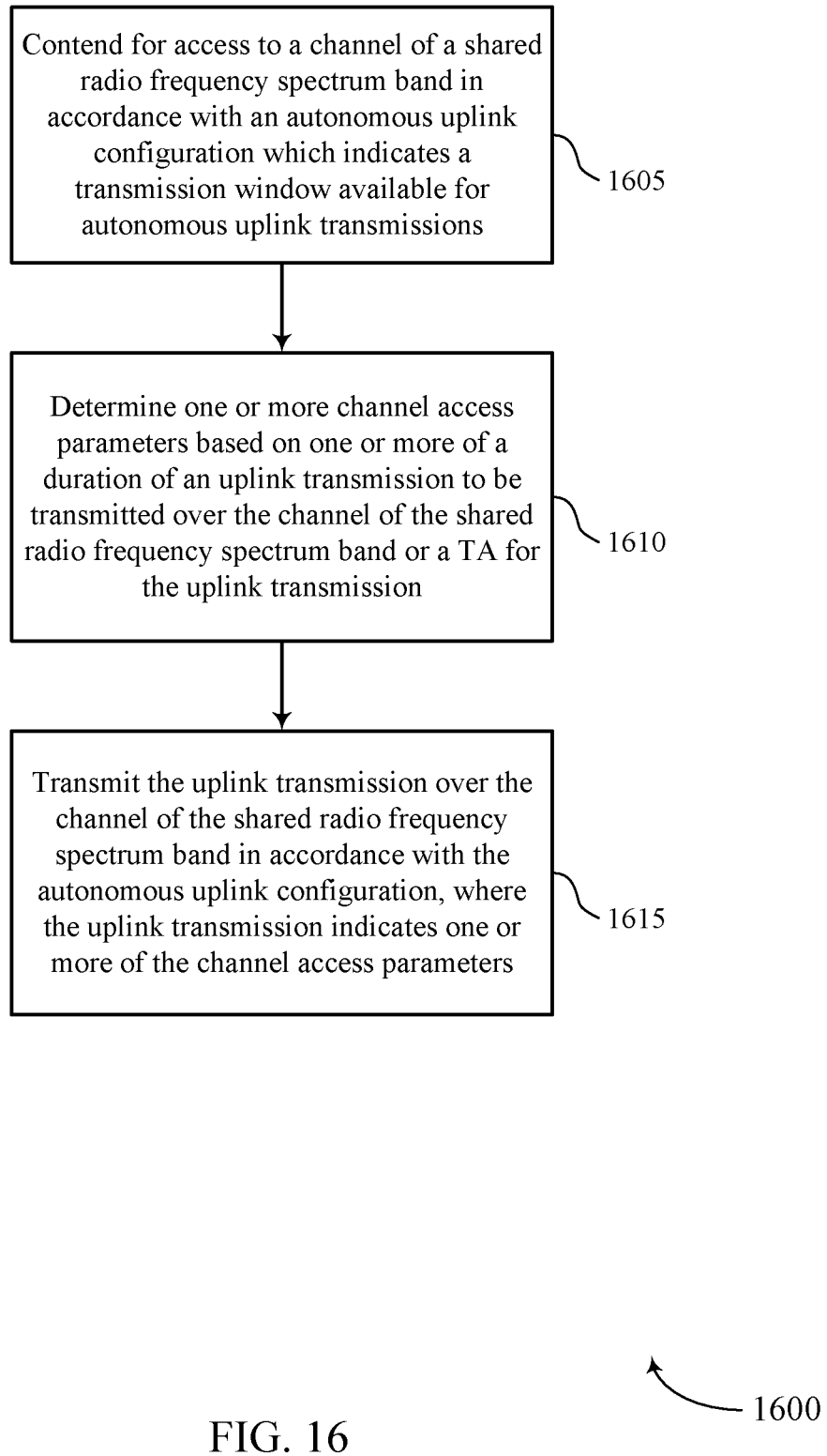
FIGS. 16 through 25 illustrate methods for autonomous uplink transmission techniques using shared radio frequency spectrum in accordance with aspects of the present disclosure.

FIG. 16 shows a flowchart illustrating a method 1600 for autonomous uplink transmission techniques using shared radio frequency spectrum in accordance with various aspects of the present disclosure. The operations of method 1600 may be implemented by a UE 115 or its components as described herein. For example, the operations of method 1600 may be performed by a UE autonomous uplink manager as described with reference to FIGS. 8 through 11. In some examples, a UE 115 may execute a set of codes to control the functional elements of the device to perform the functions described below. Additionally or alternatively, the UE 115 may perform aspects of the functions described below using special-purpose hardware.

At block 1605 the UE 115 may contend for access to a channel of a shared radio frequency spectrum band in accordance with an autonomous uplink configuration which indicates a transmission window available for autonomous uplink transmissions. The operations of block 1605 may be performed according to the methods described with reference to FIGS. 1 through 7. In certain examples, aspects of the operations of block 1605 may be performed by a LBT manager as described with reference to FIGS. 8 through 11.

At block 1610 the UE 115 may determine one or more channel access parameters based at least in part on one or more of a duration of an uplink transmission to be transmitted over the channel of the shared radio frequency spectrum band or a TA for the uplink transmission. The operations of block 1610 may be performed according to the methods described with reference to FIGS. 1 through 7. In certain examples, aspects of the operations of block 1610 may be performed by a control information component as described with reference to FIGS. 8 through 11.

At block 1615 the UE 115 may transmit the uplink transmission over the channel of the shared radio frequency spectrum band in accordance with the autonomous uplink configuration, wherein the uplink transmission indicates one or more of the channel access parameters. The operations of block 1615 may be performed according to the methods described with reference to FIGS. 1 through 7. In certain examples, aspects of the operations of block 1615 may be performed by a data manager as described with reference to FIGS. 8 through 11.

Figure 17:
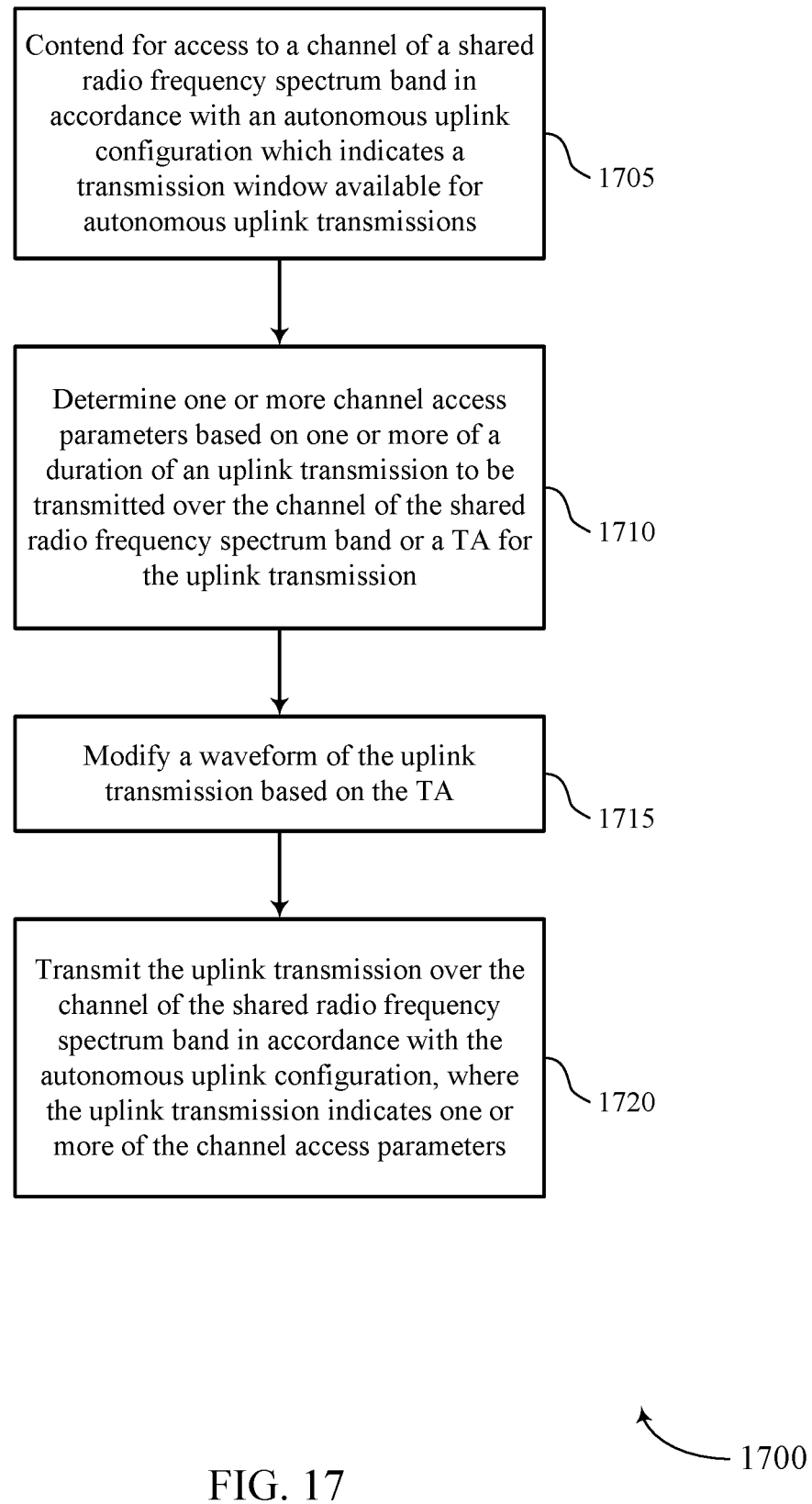

FIG. 17 shows a flowchart illustrating a method 1700 for autonomous uplink transmission techniques using shared radio frequency spectrum in accordance with various aspects of the present disclosure. The operations of method 1700 may be implemented by a UE 115 or its components as described herein. For example, the operations of method 1700 may be performed by a UE autonomous uplink manager as described with reference to FIGS. 8 through 11. In some examples, a UE 115 may execute a set of codes to control the functional elements of the device to perform the functions described below. Additionally or alternatively, the UE 115 may perform aspects of the functions described below using special-purpose hardware.

At block 1705 the UE 115 may contend for access to a channel of a shared radio frequency spectrum band in accordance with an autonomous uplink configuration which indicates a transmission window available for autonomous uplink transmissions. The operations of block 1705 may be performed according to the methods described with reference to FIGS. 1 through 7. In certain examples, aspects of the operations of block 1705 may be performed by a LBT manager as described with reference to FIGS. 8 through 11.

At block 1710 the UE 115 may determine one or more channel access parameters based at least in part on one or more of a duration of an uplink transmission to be transmitted over the channel of the shared radio frequency spectrum band or a TA for the uplink transmission. The operations of block 1710 may be performed according to the methods described with reference to FIGS. 1 through 7. In certain examples, aspects of the operations of block 1710 may be performed by a control information component as described with reference to FIGS. 8 through 11.

At block 1715 the UE 115 may modify a waveform of the uplink transmission based at least in part on the TA. The operations of block 1715 may be performed according to the methods described with reference to FIGS. 1 through 7. In certain examples, aspects of the operations of block 1715 may be performed by a data manager as described with reference to FIGS. 8 through 11.

At block 1720 the UE 115 may transmit the uplink transmission over the channel of the shared radio frequency spectrum band in accordance with the autonomous uplink configuration, wherein the uplink transmission indicates one or more of the channel access parameters. The operations of block 1720 may be performed according to the methods described with reference to FIGS. 1 through 7. In certain examples, aspects of the operations of block 1720 may be performed by a data manager as described with reference to FIGS. 8 through 11.

Figure 18:
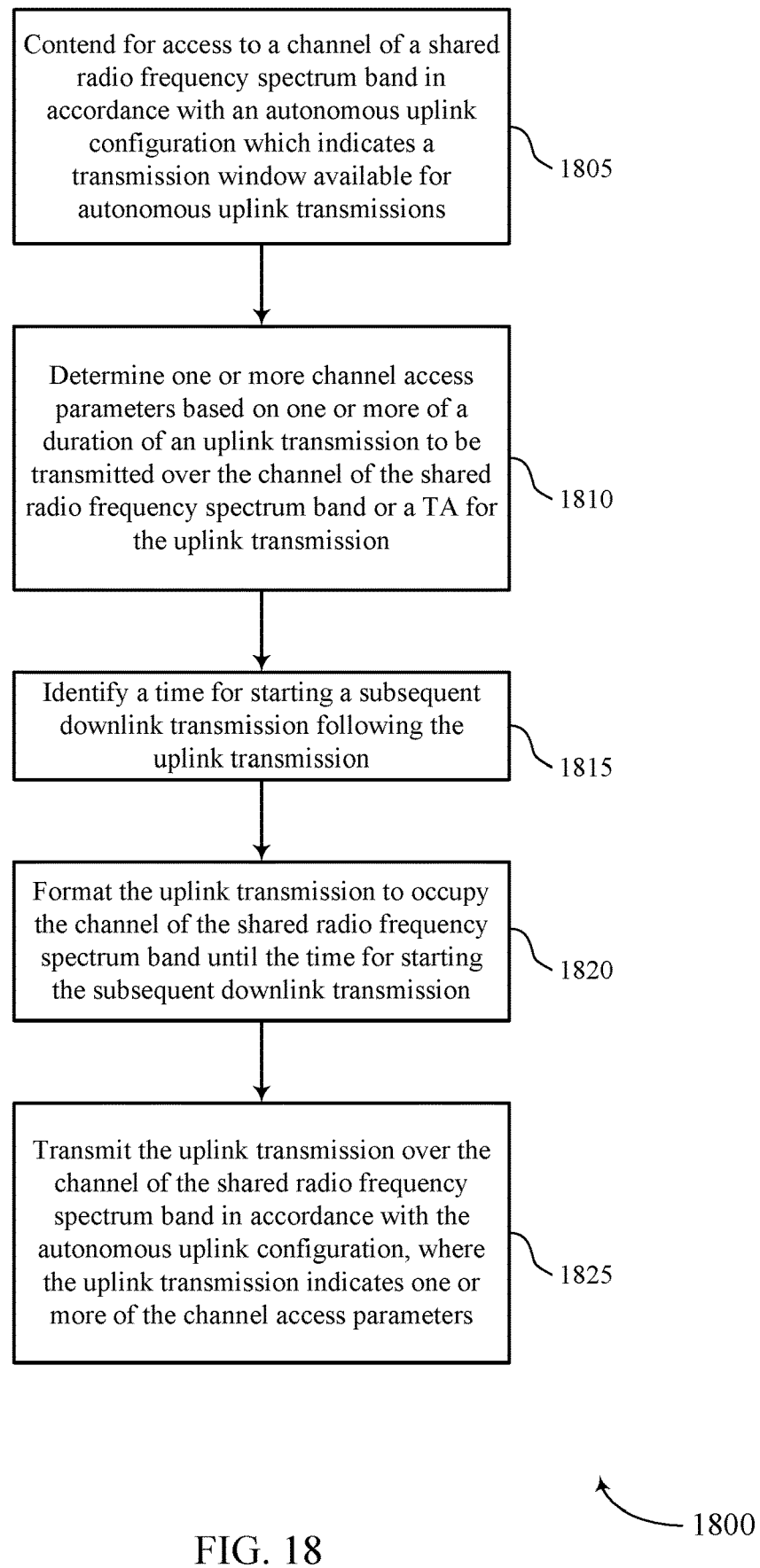

FIG. 18 shows a flowchart illustrating a method 1800 for autonomous uplink transmission techniques using shared radio frequency spectrum in accordance with various aspects of the present disclosure. The operations of method 1800 may be implemented by a UE 115 or its components as described herein. For example, the operations of method 1800 may be performed by a UE autonomous uplink manager as described with reference to FIGS. 8 through 11. In some examples, a UE 115 may execute a set of codes to control the functional elements of the device to perform the functions described below. Additionally or alternatively, the UE 115 may perform aspects of the functions described below using special-purpose hardware.

At block 1805 the UE 115 may contend for access to a channel of a shared radio frequency spectrum band in accordance with an autonomous uplink configuration which indicates a transmission window available for autonomous uplink transmissions. The operations of block 1805 may be performed according to the methods described with reference to FIGS. 1 through 7. In certain examples, aspects of the operations of block 1805 may be performed by a LBT manager as described with reference to FIGS. 8 through 11.

At block 1810 the UE 115 may determine one or more channel access parameters based at least in part on one or more of a duration of an uplink transmission to be transmitted over the channel of the shared radio frequency spectrum band or a TA for the uplink transmission. The operations of block 1810 may be performed according to the methods described with reference to FIGS. 1 through 7. In certain examples, aspects of the operations of block 1810 may be performed by a control information component as described with reference to FIGS. 8 through 11.

At block 1815 the UE 115 may identify a time for starting a subsequent downlink transmission following the uplink transmission. The operations of block 1815 may be performed according to the methods described with reference to FIGS. 1 through 7. In certain examples, aspects of the operations of block 1815 may be performed by a timing gap component as described with reference to FIGS. 8 through 11.

At block 1820 the UE 115 may format the uplink transmission to occupy the channel of the shared radio frequency spectrum band until the time for starting the subsequent downlink transmission, wherein a transmitter of the subsequent downlink transmission performs a CCA to occupy a maximum time gap between the uplink transmission and the subsequent downlink transmission. The operations of block 1820 may be performed according to the methods described with reference to FIGS. 1 through 7. In certain examples, aspects of the operations of block 1820 may be performed by a timing gap component as described with reference to FIGS. 8 through 11.

At block 1825 the UE 115 may transmit the uplink transmission over the channel of the shared radio frequency spectrum band in accordance with the autonomous uplink configuration, wherein the uplink transmission indicates one or more of the channel access parameters. The operations of block 1825 may be performed according to the methods described with reference to FIGS. 1 through 7. In certain examples, aspects of the operations of block 1825 may be performed by a data manager as described with reference to FIGS. 8 through 11.

Figure 19:
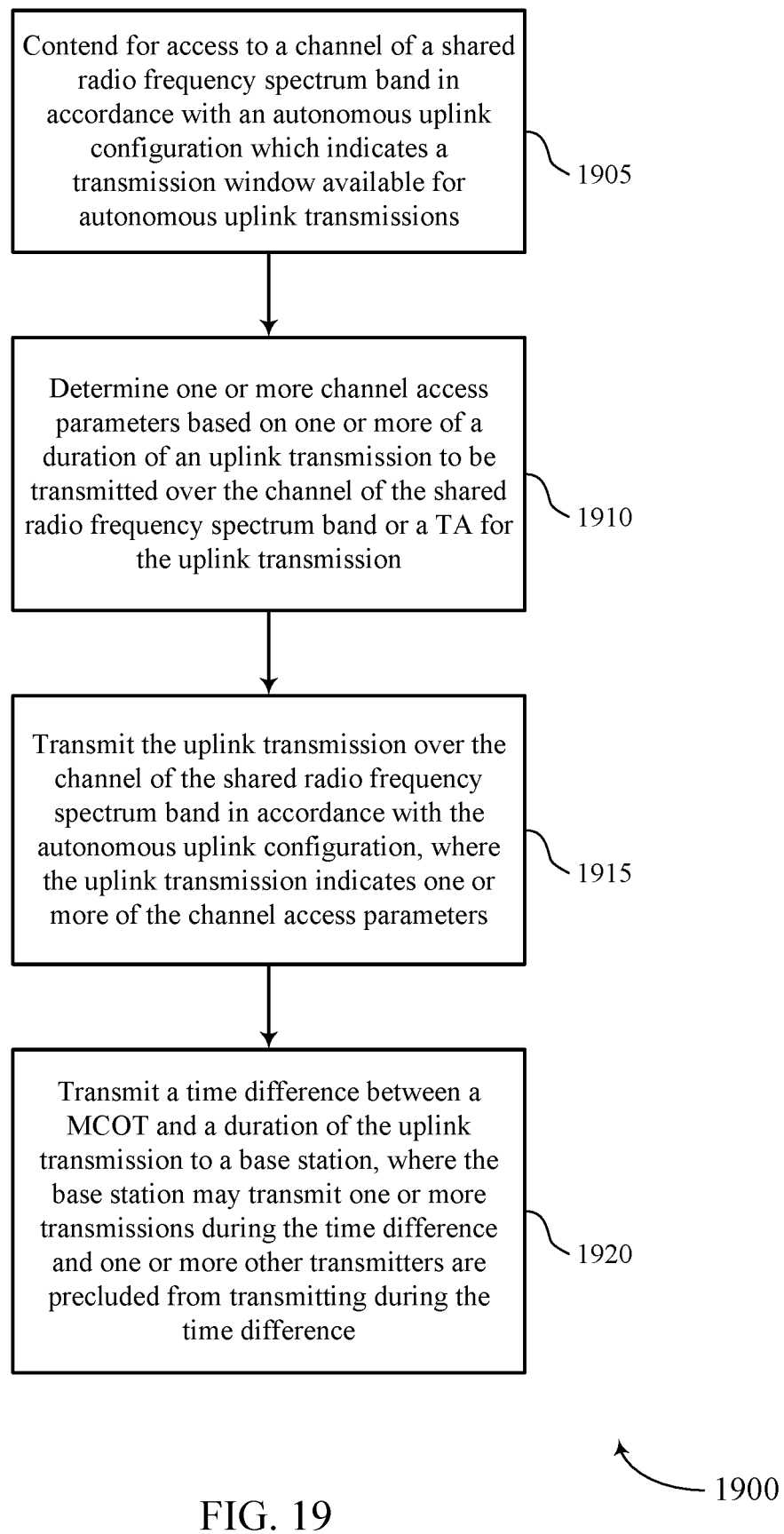

FIG. 19 shows a flowchart illustrating a method 1900 for autonomous uplink transmission techniques using shared radio frequency spectrum in accordance with various aspects of the present disclosure. The operations of method 1900 may be implemented by a UE 115 or its components as described herein. For example, the operations of method 1900 may be performed by a UE autonomous uplink manager as described with reference to FIGS. 8 through 11. In some examples, a UE 115 may execute a set of codes to control the functional elements of the device to perform the functions described below. Additionally or alternatively, the UE 115 may perform aspects of the functions described below using special-purpose hardware.

At block 1905 the UE 115 may contend for access to a channel of a shared radio frequency spectrum band in accordance with an autonomous uplink configuration which indicates a transmission window available for autonomous uplink transmissions. The operations of block 1905 may be performed according to the methods described with reference to FIGS. 1 through 7. In certain examples, aspects of the operations of block 1905 may be performed by a LBT manager as described with reference to FIGS. 8 through 11.

At block 1910 the UE 115 may determine one or more channel access parameters based at least in part on one or more of a duration of an uplink transmission to be transmitted over the channel of the shared radio frequency spectrum band or a TA for the uplink transmission. The operations of block 1910 may be performed according to the methods described with reference to FIGS. 1 through 7. In certain examples, aspects of the operations of block 1910 may be performed by a control information component as described with reference to FIGS. 8 through 11.

At block 1915 the UE 115 may transmit the uplink transmission over the channel of the shared radio frequency spectrum band in accordance with the autonomous uplink configuration, wherein the uplink transmission indicates one or more of the channel access parameters. The operations of block 1915 may be performed according to the methods described with reference to FIGS. 1 through 7. In certain examples, aspects of the operations of block 1915 may be performed by a data manager as described with reference to FIGS. 8 through 11.

At block 1920 the UE 115 may transmit a time difference between a MCOT and a duration of the uplink transmission to a base station, wherein the base station may transmit one or more transmissions during the time difference and one or more other transmitters are precluded from transmitting during the time difference. The operations of block 1920 may be performed according to the methods described with reference to FIGS. 1 through 7. In certain examples, aspects of the operations of block 1920 may be performed by a timing gap component as described with reference to FIGS. 8 through 11.

Figure 20:
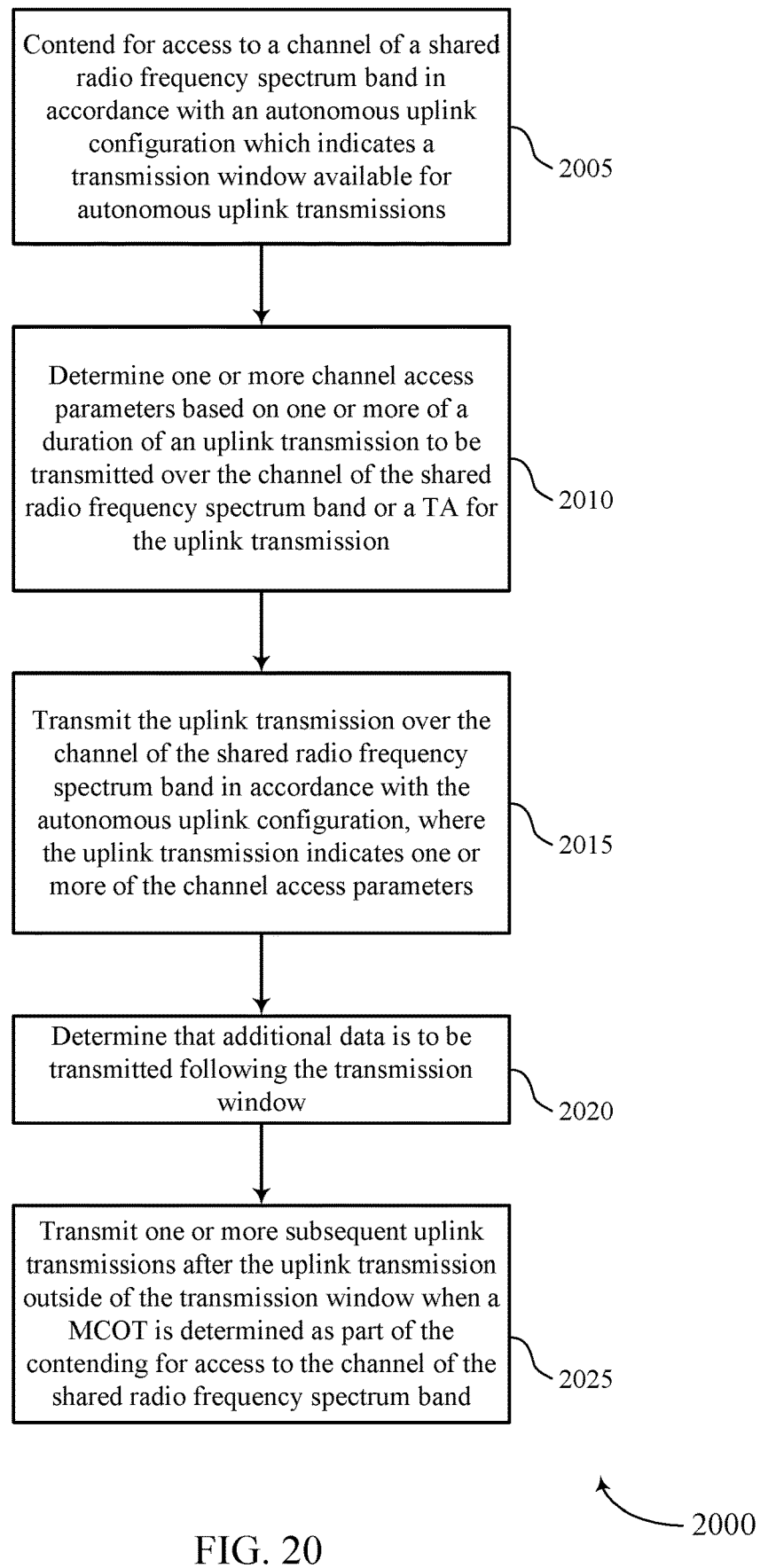

FIG. 20 shows a flowchart illustrating a method 2000 for autonomous uplink transmission techniques using shared radio frequency spectrum in accordance with various aspects of the present disclosure. The operations of method 2000 may be implemented by a UE 115 or its components as described herein. For example, the operations of method 2000 may be performed by a UE autonomous uplink manager as described with reference to FIGS. 8 through 11. In some examples, a UE 115 may execute a set of codes to control the functional elements of the device to perform the functions described below. Additionally or alternatively, the UE 115 may perform aspects of the functions described below using special-purpose hardware.

At block 2005 the UE 115 may contend for access to a channel of a shared radio frequency spectrum band in accordance with an autonomous uplink configuration which indicates a transmission window available for autonomous uplink transmissions. The operations of block 2005 may be performed according to the methods described with reference to FIGS. 1 through 7. In certain examples, aspects of the operations of block 2005 may be performed by a LBT manager as described with reference to FIGS. 8 through 11.

At block 2010 the UE 115 may determine one or more channel access parameters based at least in part on one or more of a duration of an uplink transmission to be transmitted over the channel of the shared radio frequency spectrum band or a TA for the uplink transmission. The operations of block 2010 may be performed according to the methods described with reference to FIGS. 1 through 7. In certain examples, aspects of the operations of block 2010 may be performed by a control information component as described with reference to FIGS. 8 through 11.

At block 2015 the UE 115 may transmit the uplink transmission over the channel of the shared radio frequency spectrum band in accordance with the autonomous uplink configuration, wherein the uplink transmission indicates one or more of the channel access parameters. The operations of block 2015 may be performed according to the methods described with reference to FIGS. 1 through 7. In certain examples, aspects of the operations of block 2015 may be performed by a data manager as described with reference to FIGS. 8 through 11.

At block 2020 the UE 115 may determine that additional data is to be transmitted following the transmission window. The operations of block 2020 may be performed according to the methods described with reference to FIGS. 1 through 7. In certain examples, aspects of the operations of block 2020 may be performed by a data manager as described with reference to FIGS. 8 through 11.

At block 2025 the UE 115 may transmit one or more subsequent uplink transmissions after the uplink transmission outside of the transmission window when a MCOT is determined as part of the contending for access to the channel of the shared radio frequency spectrum band. The operations of block 2025 may be performed according to the methods described with reference to FIGS. 1 through 7. In certain examples, aspects of the operations of block 2025 may be performed by a data manager as described with reference to FIGS. 8 through 11.

Figure 21:
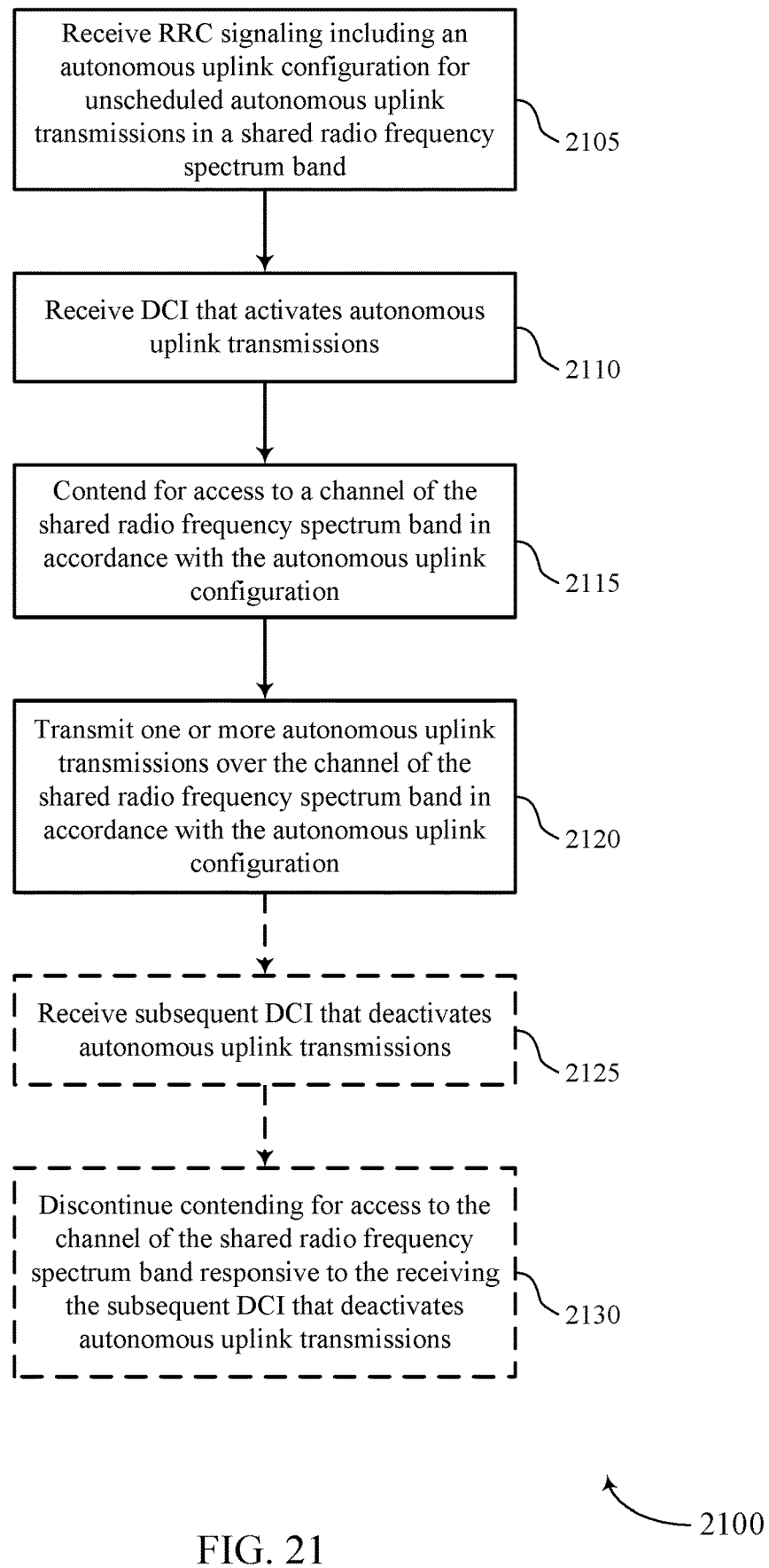

FIG. 21 shows a flowchart illustrating a method 2100 for autonomous uplink transmission techniques using shared radio frequency spectrum in accordance with various aspects of the present disclosure. The operations of method 2100 may be implemented by a UE 115 or its components as described herein. For example, the operations of method 2100 may be performed by a UE autonomous uplink manager as described with reference to FIGS. 8 through 11. In some examples, a UE 115 may execute a set of codes to control the functional elements of the device to perform the functions described below. Additionally or alternatively, the UE 115 may perform aspects of the functions described below using special-purpose hardware.

At block 2105 the UE 115 may receive RRC signaling including an autonomous uplink configuration for unscheduled autonomous uplink transmissions in a shared radio frequency spectrum band. The operations of block 2105 may be performed according to the methods described with reference to FIGS. 1 through 7. In certain examples, aspects of the operations of block 2105 may be performed by an autonomous uplink configuration manager as described with reference to FIGS. 8 through 11.

At block 2110 the UE 115 may receive DCI that activates autonomous uplink transmissions. The operations of block 2110 may be performed according to the methods described with reference to FIGS. 1 through 7. In certain examples, aspects of the operations of block 2110 may be performed by a control information component as described with reference to FIGS. 8 through 11.

At block 2115 the UE 115 may contend for access to a channel of the shared radio frequency spectrum band in accordance with the autonomous uplink configuration. The operations of block 2115 may be performed according to the methods described with reference to FIGS. 1 through 7. In certain examples, aspects of the operations of block 2115 may be performed by a LBT manager as described with reference to FIGS. 8 through 11.

At block 2120 the UE 115 may transmit one or more autonomous uplink transmissions over the channel of the shared radio frequency spectrum band in accordance with the autonomous uplink configuration. The operations of block 2120 may be performed according to the methods described with reference to FIGS. 1 through 7. In certain examples, aspects of the operations of block 2120 may be performed by a data manager as described with reference to FIGS. 8 through 11.

At optional block 2125 the UE 115 may receive subsequent DCI that deactivates autonomous uplink transmissions. The operations of block 2125 may be performed according to the methods described with reference to FIGS. 1 through 7. In certain examples, aspects of the operations of block 2125 may be performed by a control information component as described with reference to FIGS. 8 through 11.

At optional block 2130 the UE 115 may discontinue contending for access to the channel of the shared radio frequency spectrum band responsive to the receiving the subsequent DCI that deactivates autonomous uplink transmissions. The operations of block 2130 may be performed according to the methods described with reference to FIGS. 1 through 7. In certain examples, aspects of the operations of block 2130 may be performed by a data manager as described with reference to FIGS. 8 through 11.

Figure 22:
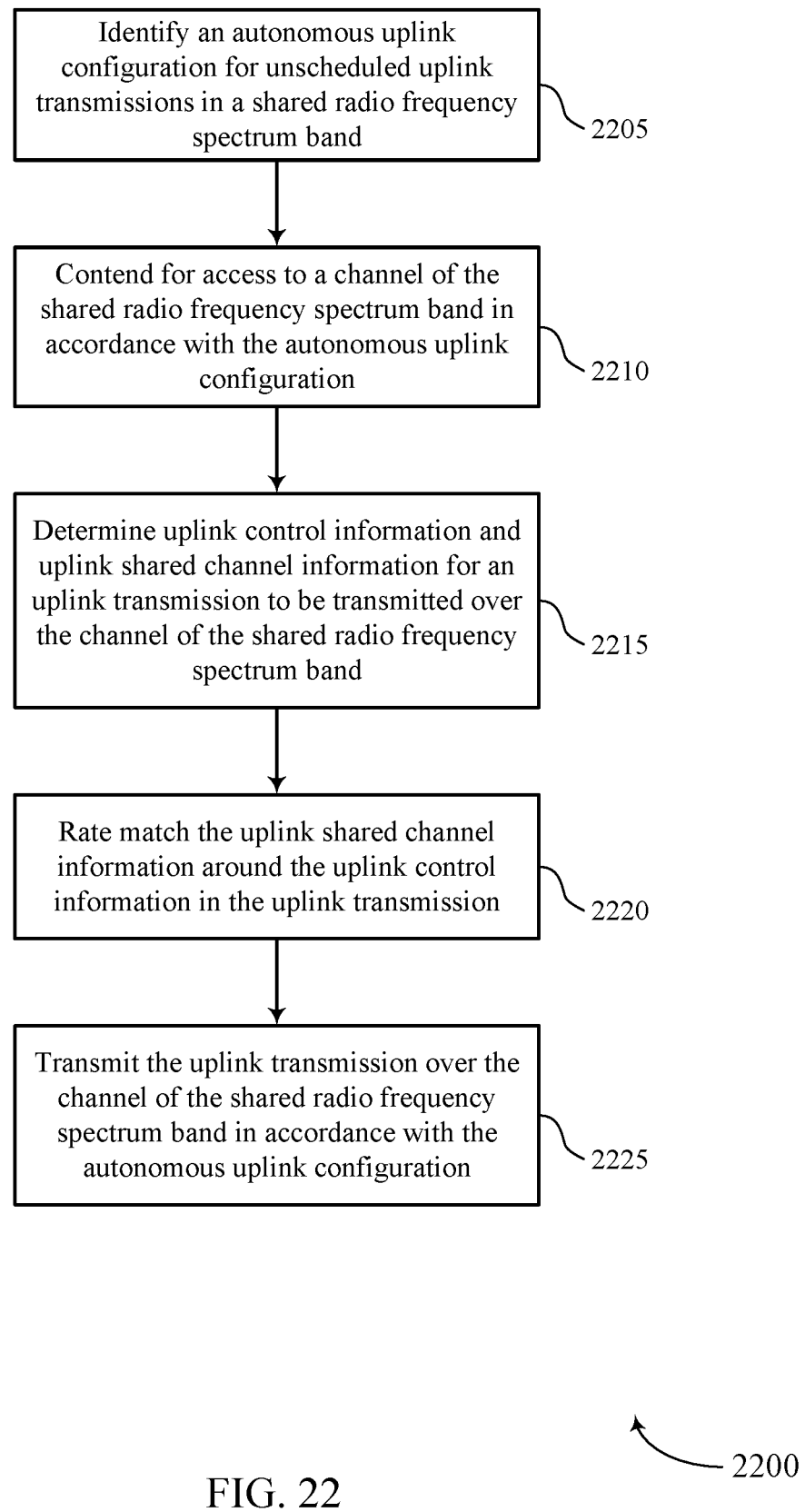

FIG. 22 shows a flowchart illustrating a method 2200 for autonomous uplink transmission techniques using shared radio frequency spectrum in accordance with various aspects of the present disclosure. The operations of method 2200 may be implemented by a UE 115 or its components as described herein. For example, the operations of method 2200 may be performed by a UE autonomous uplink manager as described with reference to FIGS. 8 through 11. In some examples, a UE 115 may execute a set of codes to control the functional elements of the device to perform the functions described below. Additionally or alternatively, the UE 115 may perform aspects of the functions described below using special-purpose hardware.

At block 2205 the UE 115 may identify an autonomous uplink configuration for unscheduled uplink transmissions in a shared radio frequency spectrum band. The operations of block 2205 may be performed according to the methods described with reference to FIGS. 1 through 7. In certain examples, aspects of the operations of block 2205 may be performed by an autonomous uplink configuration manager as described with reference to FIGS. 8 through 11.

At block 2210 the UE 115 may contend for access to a channel of the shared radio frequency spectrum band in accordance with the autonomous uplink configuration. The operations of block 2210 may be performed according to the methods described with reference to FIGS. 1 through 7. In certain examples, aspects of the operations of block 2210 may be performed by a LBT manager as described with reference to FIGS. 8 through 11.

At block 2215 the UE 115 may determine uplink control information and uplink shared channel information for an uplink transmission to be transmitted over the channel of the shared radio frequency spectrum band. The operations of block 2215 may be performed according to the methods described with reference to FIGS. 1 through 7. In certain examples, aspects of the operations of block 2215 may be performed by a control information component as described with reference to FIGS. 8 through 11.

At block 2220 the UE 115 may rate match the uplink shared channel information around the uplink control information in the uplink transmission. The operations of block 2220 may be performed according to the methods described with reference to FIGS. 1 through 7. In certain examples, aspects of the operations of block 2220 may be performed by a data manager as described with reference to FIGS. 8 through 11.

At block 2225 the UE 115 may transmit the uplink transmission over the channel of the shared radio frequency spectrum band in accordance with the autonomous uplink configuration. The operations of block 2225 may be performed according to the methods described with reference to FIGS. 1 through 7. In certain examples, aspects of the operations of block 2225 may be performed by a data manager as described with reference to FIGS. 8 through 11.

Figure 23:
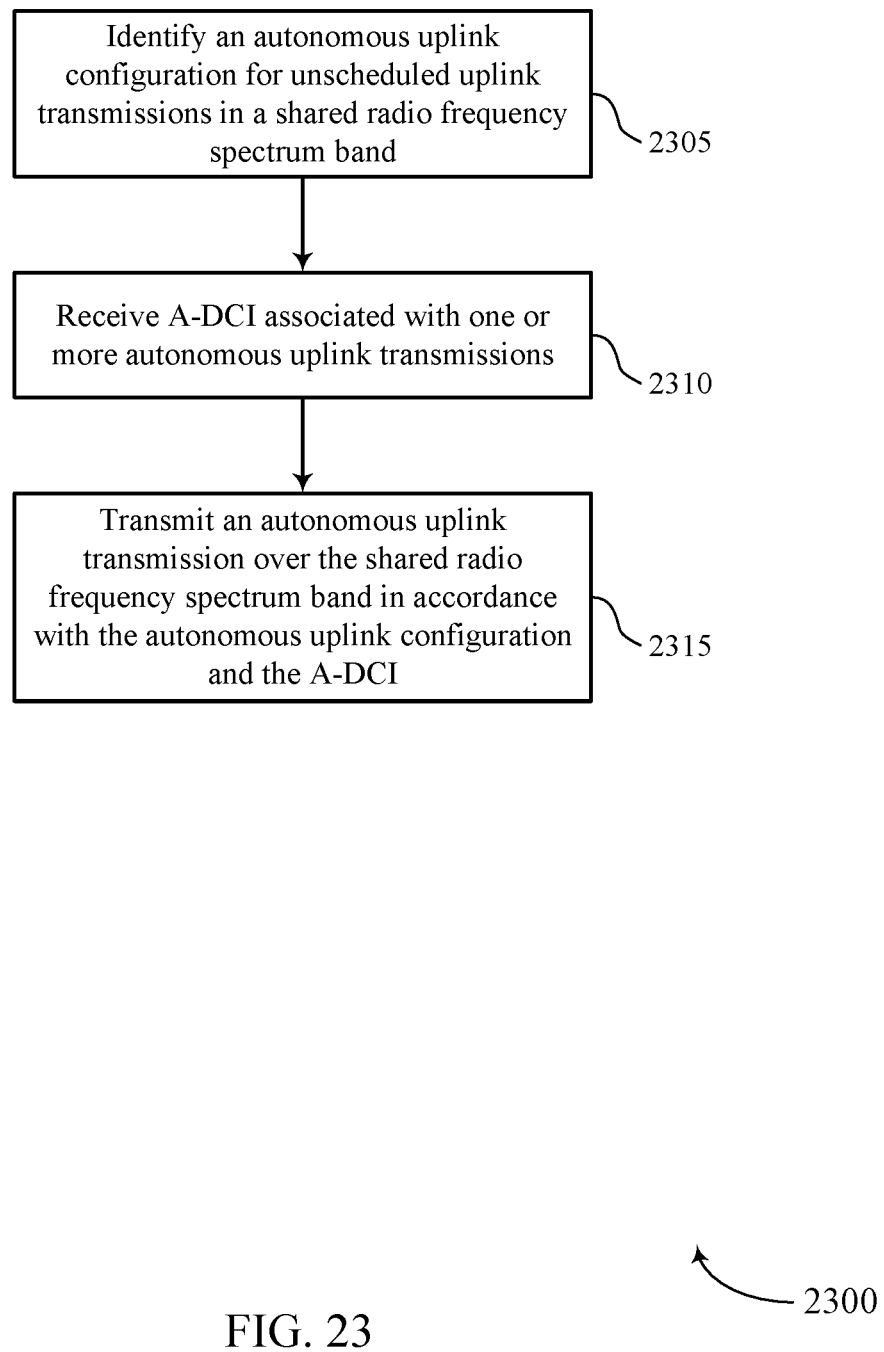

FIG. 23 shows a flowchart illustrating a method 2300 for autonomous uplink transmission techniques using shared radio frequency spectrum in accordance with various aspects of the present disclosure. The operations of method 2300 may be implemented by a UE 115 or its components as described herein. For example, the operations of method 2300 may be performed by a UE autonomous uplink manager as described with reference to FIGS. 8 through 11. In some examples, a UE 115 may execute a set of codes to control the functional elements of the device to perform the functions described below. Additionally or alternatively, the UE 115 may perform aspects of the functions described below using special-purpose hardware.

At block 2305 the UE 115 may identify an autonomous uplink configuration for unscheduled uplink transmissions in a shared radio frequency spectrum band. The operations of block 2305 may be performed according to the methods described with reference to FIGS. 1 through 7. In certain examples, aspects of the operations of block 2305 may be performed by an autonomous uplink configuration manager as described with reference to FIGS. 8 through 11.

At block 2310 the UE 115 may receive A-DCI associated with one or more autonomous uplink transmissions. The operations of block 2310 may be performed according to the methods described with reference to FIGS. 1 through 7. In certain examples, aspects of the operations of block 2310 may be performed by a control information component as described with reference to FIGS. 8 through 11.

At block 2315 the UE 115 may transmit an autonomous uplink transmission over the shared radio frequency spectrum band in accordance with the autonomous uplink configuration and the A-DCI. The operations of block 2315 may be performed according to the methods described with reference to FIGS. 1 through 7. In certain examples, aspects of the operations of block 2315 may be performed by a data manager as described with reference to FIGS. 8 through 11.

Figure 24:
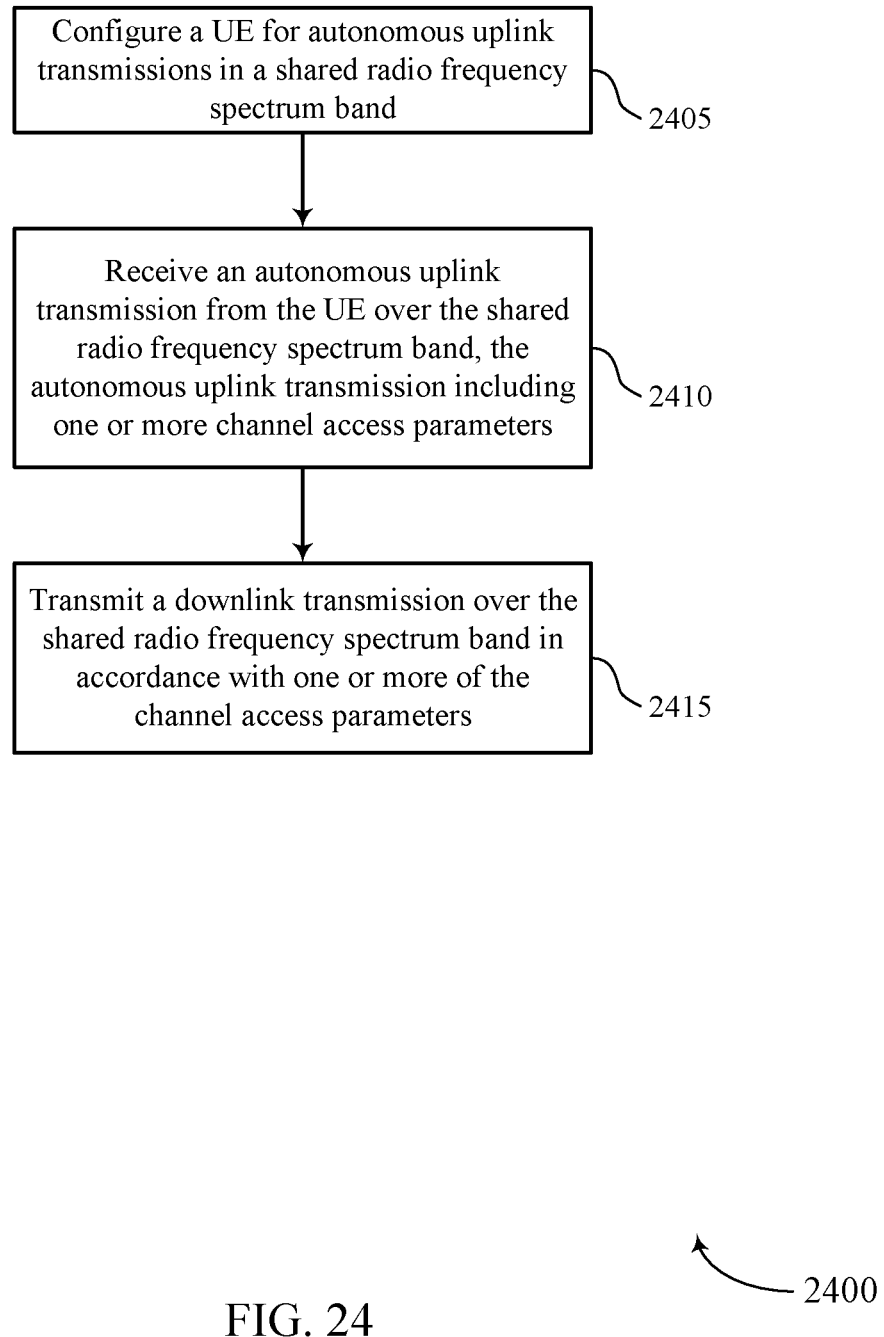

FIG. 24 shows a flowchart illustrating a method 2400 for autonomous uplink transmission techniques using shared radio frequency spectrum in accordance with various aspects of the present disclosure. The operations of method 2400 may be implemented by a base station 105 or its components as described herein. For example, the operations of method 2400 may be performed by a base station autonomous uplink manager as described with reference to FIGS. 12 through 15. In some examples, a base station 105 may execute a set of codes to control the functional elements of the device to perform the functions described below. Additionally or alternatively, the base station 105 may perform aspects of the functions described below using special-purpose hardware.

At block 2405 the base station 105 may configure a UE for autonomous uplink transmissions in a shared radio frequency spectrum band. The operations of block 2405 may be performed according to the methods described with reference to FIGS. 1 through 7. In certain examples, aspects of the operations of block 2405 may be performed by an autonomous uplink configuration manager as described with reference to FIGS. 12 through 15.

At block 2410 the base station 105 may receive an autonomous uplink transmission from the UE over the shared radio frequency spectrum band, the autonomous uplink transmission including one or more channel access parameters. The operations of block 2410 may be performed according to the methods described with reference to FIGS. 1 through 7. In certain examples, aspects of the operations of block 2410 may be performed by a AUL channel access manager as described with reference to FIGS. 12 through 15.

At block 2415 the base station 105 may transmit a downlink transmission over the shared radio frequency spectrum band in accordance with one or more of the channel access parameters. The operations of block 2415 may be performed according to the methods described with reference to FIGS. 1 through 7. In certain examples, aspects of the operations of block 2415 may be performed by a data manager as described with reference to FIGS. 12 through 15.

Figure 25:
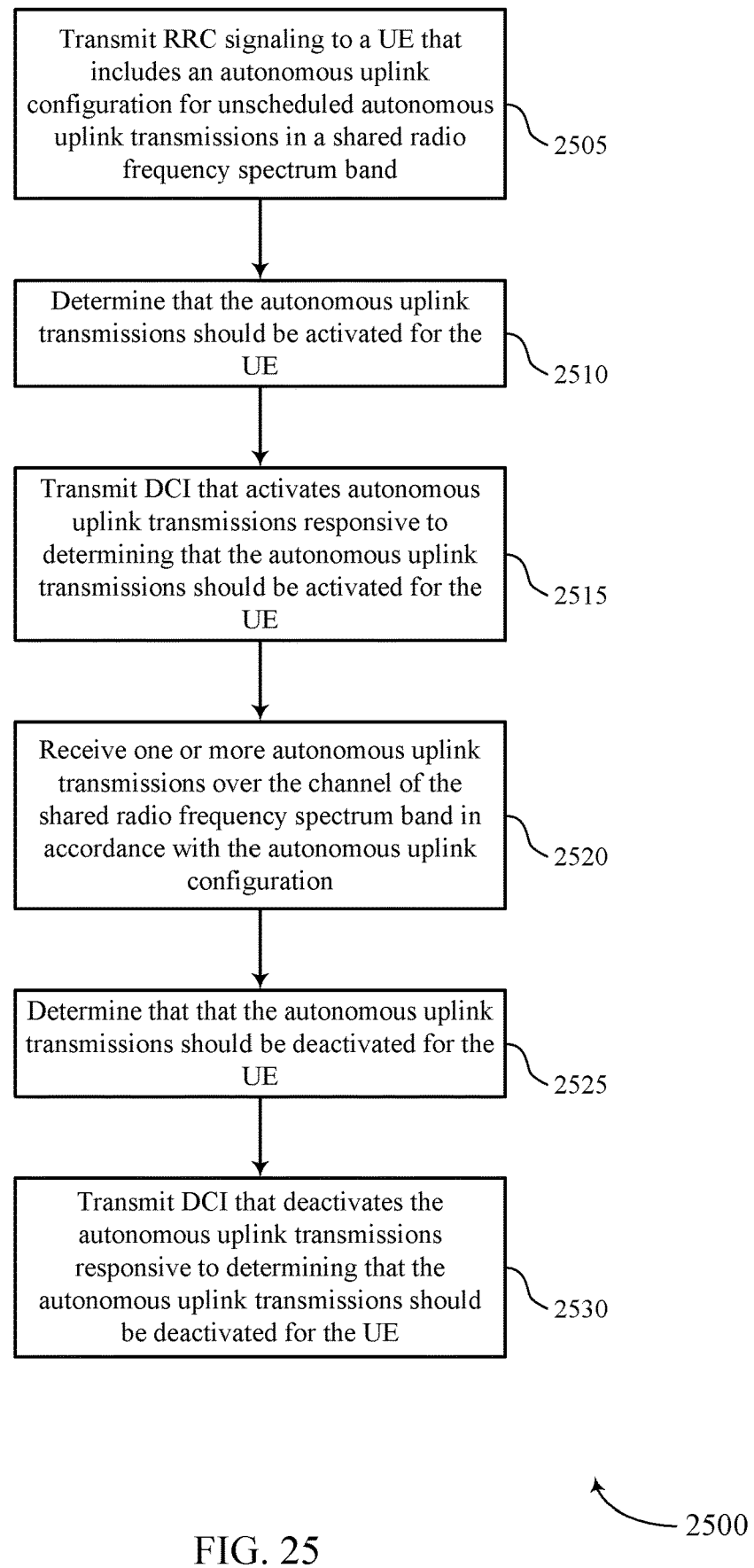

FIG. 25 shows a flowchart illustrating a method 2500 for autonomous uplink transmission techniques using shared radio frequency spectrum in accordance with various aspects of the present disclosure. The operations of method 2500 may be implemented by a base station 105 or its components as described herein. For example, the operations of method 2500 may be performed by a base station autonomous uplink manager as described with reference to FIGS. 12 through 15. In some examples, a base station 105 may execute a set of codes to control the functional elements of the device to perform the functions described below. Additionally or alternatively, the base station 105 may perform aspects of the functions described below using special-purpose hardware.

At block 2505 the base station 105 may transmit RRC signaling to a UE that includes an autonomous uplink configuration for unscheduled autonomous uplink transmissions in a shared radio frequency spectrum band. The operations of block 2505 may be performed according to the methods described with reference to FIGS. 1 through 7. In certain examples, aspects of the operations of block 2505 may be performed by an autonomous uplink configuration manager as described with reference to FIGS. 12 through 15.

At block 2510 the base station 105 may determine that the autonomous uplink transmissions should be activated for the UE. The operations of block 2510 may be performed according to the methods described with reference to FIGS. 1 through 7. In certain examples, aspects of the operations of block 2510 may be performed by a AUL activation component as described with reference to FIGS. 12 through 15.

At block 2515 the base station 105 may transmit DCI that activates autonomous uplink transmissions responsive to determining that the autonomous uplink transmissions should be activated for the UE. The operations of block 2515 may be performed according to the methods described with reference to FIGS. 1 through 7. In certain examples, aspects of the operations of block 2515 may be performed by a control information component as described with reference to FIGS. 12 through 15.

At block 2520 the base station 105 may receive one or more autonomous uplink transmissions over the channel of the shared radio frequency spectrum band in accordance with the autonomous uplink configuration. The operations of block 2520 may be performed according to the methods described with reference to FIGS. 1 through 7. In certain examples, aspects of the operations of block 2520 may be performed by a receiver as described with reference to FIGS. 12 through 15.

At block 2525 the base station 105 may determine that that the autonomous uplink transmissions should be deactivated for the UE. The operations of block 2525 may be performed according to the methods described with reference to FIGS. 1 through 7. In certain examples, aspects of the operations of block 2525 may be performed by a AUL activation component as described with reference to FIGS. 12 through 15.

At block 2530 the base station 105 may transmit DCI that deactivates the autonomous uplink transmissions responsive to determining that the autonomous uplink transmissions should be deactivated for the UE. The operations of block 2530 may be performed according to the methods described with reference to FIGS. 1 through 7. In certain examples, aspects of the operations of block 2530 may be performed by a control information component as described with reference to FIGS. 12 through 15.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM).

An orthogonal frequency division multiple access (OFDMA) system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are releases of Universal Mobile Telecommunications System (UMTS) that use E-UTRA. UTRA, E-UTRA, UMTS, LTE, LTE-A, NR, and Global System for Mobile communications (GSM) are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of evolved node B (eNBs) provide coverage for various geographical regions. For example, each eNB, gNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), next generation NodeB (gNB), Home NodeB, a Home eNodeB, or some other suitable terminology. The geographic coverage area for a base station may be divided into sectors making up a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
receiving, from a base station, radio resource control (RRC) signaling including an autonomous uplink configuration for unscheduled autonomous uplink transmissions in a shared radio frequency spectrum band with the base station;
receiving downlink control information (DCI) for activating autonomous uplink transmissions;
activating the autonomous uplink transmissions based at least in part on receiving the DCI;
sensing, during a configured time duration, for activity on a channel of the shared radio frequency spectrum band based at least in part on activating the autonomous uplink transmissions;
contending for access to the channel of the shared radio frequency spectrum band in accordance with the autonomous uplink configuration based at least in part on sensing for activity on the channel; and
transmitting, to the base station, one or more autonomous uplink transmissions over the channel of the shared radio frequency spectrum band in accordance with the autonomous uplink configuration.

2. The method of claim 1, further comprising:
receiving subsequent DCI that deactivates the autonomous uplink transmissions; and
discontinuing contending for access to the channel of the shared radio frequency spectrum band responsive to receiving the subsequent DCI.

3. The method of claim 1, wherein the DCI comprises a cyclic redundancy check (CRC) field scrambled with an identifier.

4. The method of claim 3, wherein a value of the identifier indicates that the DCI is associated with the autonomous uplink transmissions.

5. The method of claim 1, wherein the autonomous uplink configuration enables the autonomous uplink transmissions on one or more transmit antennas according to a multiple input multiple output (MIMO) configuration.

6. An apparatus for wireless communication, comprising:
a processor;
memory coupled with the processor; and instructions stored in the memory and executable by the processor to cause the apparatus to:
receive, from a base station, radio resource control (RRC) signaling including an autonomous uplink configuration for unscheduled autonomous uplink transmissions in a shared radio frequency spectrum band with the base station;
receive downlink control information (DCI) for activating autonomous uplink transmissions;
activating the autonomous uplink transmissions based at least in part on receiving the DCI;
sense, during a configured time duration, for activity on a channel of the shared radio frequency spectrum band based at least in part on activating the autonomous uplink transmissions;
contend for access to the channel of the shared radio frequency spectrum band in accordance with the autonomous uplink configuration based at least in part on sensing for activity on the channel; and
transmit, to the base station, one or more autonomous uplink transmissions over the channel of the shared radio frequency spectrum band in accordance with the autonomous uplink configuration.

7. The apparatus of claim 6, wherein the instructions are further executable by the processor to cause the apparatus to:
receive subsequent DCI that deactivates the autonomous uplink transmissions; and
discontinue contending for access to the channel of the shared radio frequency spectrum band responsive to receiving the subsequent DCI.

8. The apparatus of claim 6, wherein the DCI comprises a cyclic redundancy check (CRC) field scrambled with an identifier.

9. The apparatus of claim 8, wherein a value of the identifier indicates that the DCI is associated with the autonomous uplink transmissions.

10. The apparatus of claim 6, wherein the autonomous uplink configuration enables the autonomous uplink transmissions on one or more transmit antennas according to a multiple input multiple output (MIMO) configuration.

11. An apparatus for wireless communication, comprising:
means for receiving, from a base station, radio resource control (RRC) signaling including an autonomous uplink configuration for unscheduled autonomous uplink transmissions in a shared radio frequency spectrum band with the base station;
means for receiving downlink control information (DCI) for activating autonomous uplink transmissions;
means for activating the autonomous uplink transmissions based at least in part on receiving the DCI;
means for sensing, during a configured time duration, for activity on a channel of the shared radio frequency spectrum band based at least in part on activating the autonomous uplink transmissions;
means for contending for access to the channel of the shared radio frequency spectrum band in accordance with the autonomous uplink configuration based at least in part on sensing for activity on the channel; and
means for transmitting, to the base station, one or more autonomous uplink transmissions over the channel of the shared radio frequency spectrum band in accordance with the autonomous uplink configuration.

12. The apparatus of claim 11, further comprising:
means for receiving subsequent DCI that deactivates the autonomous uplink transmissions; and
means for discontinuing contending for access to the channel of the shared radio frequency spectrum band responsive to receiving the subsequent DCI.

13. The apparatus of claim 11, wherein the DCI comprises a cyclic redundancy check (CRC) field scrambled with an identifier.

14. The apparatus of claim 13, wherein a value of the identifier indicates that the DCI is associated with the autonomous uplink transmissions.

15. The apparatus of claim 11, wherein the autonomous uplink configuration enables the autonomous uplink transmissions on one or more transmit antennas according to a multiple input multiple output (MIMO) configuration.

* * * * *